US008092769B2

(12) United States Patent
Jewell et al.

(10) Patent No.: US 8,092,769 B2
(45) Date of Patent: Jan. 10, 2012

(54) PRODUCTION OF ONE OR MORE USEFUL PRODUCTS FROM LESSER VALUE HALOGENATED MATERIALS

(75) Inventors: Dennis Wade Jewell, Angleton, TX (US); John P. Henley, Midland, MI (US); Edward E. Timm, Freeland, MI (US); Tarver Gayle Snedecor, Jr., Angleton, TX (US); Leopoldo Salinas, III, Lake Jackson, TX (US); Charles William Lipp, Lake Jackson, TX (US); James Everett Clark, Ludington, MI (US)

(73) Assignee: Dow Global Technologies LLC, Midland, MI (US)

( * ) Notice: Subject to any disclaimer, the term of this patent is extended or adjusted under 35 U.S.C. 154(b) by 478 days.

(21) Appl. No.: 11/801,961

(22) Filed: May 11, 2007

(65) Prior Publication Data

US 2007/0282152 A1  Dec. 6, 2007

Related U.S. Application Data

(60) Division of application No. 10/104,703, filed on Mar. 22, 2002, now abandoned, which is a continuation of application No. 09/207,792, filed on Dec. 9, 1998, now abandoned.

(60) Provisional application No. 60/068,405, filed on Dec. 22, 1997.

(51) Int. Cl.
*B01D 53/68* (2006.01)
*A62D 3/37* (2007.01)

(52) U.S. Cl. ............... 423/240 R; 423/245.3; 423/488; 423/418.2; 423/648.1; 423/655; 588/316; 588/319

(58) Field of Classification Search ............... 423/245.3, 423/488, 240 R, 481, 418.2, 648.1, 655; 588/316, 588/319
See application file for complete search history.

(56) References Cited

U.S. PATENT DOCUMENTS

| 2,582,938 A | 1/1952 | du Bois Eastman et al. |
| 2,928,460 A | 3/1960 | du Bois Eastman et al. |
| 2,945,074 A | 7/1960 | Elliott et al. |
| 2,992,906 A | 7/1961 | Guptill, Jr. |
| 3,607,157 A | 9/1971 | Schlinger et al. |
| 3,647,423 A | 3/1972 | Acoveno |

(Continued)

FOREIGN PATENT DOCUMENTS

DE  4336580 A  5/1995

(Continued)

OTHER PUBLICATIONS

John J. McKetta et al, "Calcination Equipment to Catalysis", Encyclopedia of Chemical Processing and Design, 1988, pp. 210-214.

(Continued)

*Primary Examiner* — Ngoc-Yen Nguyen

(57) ABSTRACT

A process and apparatus are described for converting a feed that is substantially comprised of halogenated materials, and especially byproduct and waste chlorinated hydrocarbons as are produced from a variety of chemical manufacturing processes, to one or more higher value products via a partial oxidation reforming reaction step. These products can be in the form of a useful or salable acid product and/or a product synthesis gas comprised of carbon monoxide and hydrogen, or the reaction product including the same hydrogen halide, carbon monoxide and hydrogen components can be employed as a feed in the synthesis of a different useful or salable product.

33 Claims, 22 Drawing Sheets

U.S. PATENT DOCUMENTS

| | | | |
|---|---|---|---|
| 3,705,108 | A | 12/1972 | Marion et al. |
| 3,847,564 | A | 11/1974 | Marion et al. |
| 3,874,592 | A * | 4/1975 | Buschmann et al. ...... 239/132.3 |
| 3,945,942 | A | 3/1976 | Marion et al. |
| 3,979,188 | A | 9/1976 | McCallister |
| 3,980,758 | A | 9/1976 | Krumbock et al. |
| 4,113,445 | A | 9/1978 | Gettert et al. |
| 4,115,531 | A | 9/1978 | Opitz et al. |
| 4,211,646 | A | 7/1980 | Westbrook et al. |
| 4,338,099 | A | 7/1982 | Crouch et al. |
| 4,350,103 | A | 9/1982 | Poll |
| 4,351,645 | A | 9/1982 | Marion et al. |
| 4,371,379 | A | 2/1983 | Brent et al. |
| 4,443,230 | A | 4/1984 | Stellaccio |
| 4,468,376 | A | 8/1984 | Suggitt |
| 4,574,714 | A | 3/1986 | Bach |
| 4,602,574 | A | 7/1986 | Bach |
| 4,627,388 | A | 12/1986 | Buice |
| 4,714,604 | A | 12/1987 | Olson |
| 4,889,657 | A | 12/1989 | Jahnke |
| 4,950,309 | A | 8/1990 | Schulz |
| 4,962,247 | A | 10/1990 | Holbrook et al. |
| 5,232,487 | A | 8/1993 | Rabe et al. |
| 5,301,620 | A | 4/1994 | Nagel |
| 5,434,337 | A | 7/1995 | Kiss |
| 5,460,637 | A | 10/1995 | Connolly et al. |
| 5,463,144 | A | 10/1995 | Powell et al. |
| 5,463,145 | A | 10/1995 | Powell et al. |
| 5,463,146 | A | 10/1995 | Slaugh et al. |
| 5,470,361 | A | 11/1995 | Linke et al. |
| 5,678,244 | A | 10/1997 | Shaw et al. |
| 5,693,191 | A | 12/1997 | Pividal et al. |
| 5,866,091 | A * | 2/1999 | Stevenson et al. ........ 423/240 R |
| 5,895,822 | A | 4/1999 | Monical et al. |
| 5,904,879 | A * | 5/1999 | Winter et al. ................. 252/373 |
| 6,086,722 | A * | 7/2000 | Webster et al. ................. 203/12 |
| 6,613,127 | B1 | 9/2003 | Galloway et al. |
| 6,797,845 | B1 | 9/2004 | Hickman et al. |
| 2004/0152929 | A1 | 8/2004 | Clarke et al. |

FOREIGN PATENT DOCUMENTS

EP   0 011 904   6/1980

OTHER PUBLICATIONS

Seymour Calvert et al, "Flux Force/Condensation Scrubbing", Journal of the Air Pollution Control Association, vol. 24, No. 10, Oct. 1974, pp. 946-951.
John J. McKetta et al, "Maintenance Management to Methanol, Chemicals from", Encyclopedia of Chemical Processing and Design, 1988, pp. 423-435.
Kirk-Othmer, "Hydrogen", Encyclopedia of Chemical Technology, 4$^{th}$ ed, vol. 13, 1991, pp. 852-893.
Kirk-Othmer, "Ammonia", Encyclopediaq of Chemical Technology, 3$^{rd}$ ed., vol. 2, 1978, pp. 480-501.
"Advanced Metal Filters for Critical Gas Solid Separation Problems", The Pall Gas Solid Separation Systems For The Chemical Process, Refining, and Mineral Industries, Bulletin GSS-1, 1988, pp. 2-18.
R. R. Judkins et al, "Development of Ceramic Composite Hot-Gas Filters", Journal of Engineering for Gas Turbines and Power, vol. 118, Jul. 1996, pp. 495-499.
M. L. Croom, "Effective Selection of Filter Dust Collectors", Chemical Engineering, Jul. 1993, pp. 86-91.
K. Scheidl et al, "High Temperature Gasification (HTG) Pilot Studies With Different Waste Materials: Formation of PCDD/F and Other Organic Pollutants", Chemosphere, vol. 23, Nos. 8-10, 1991, pp. 1507-1514.
R. R. Judkins et al, "A Review of the Efficacy of Silicon Carbide Hot-Gas Filters in Coal Gasification and Pressurized Fluidized Bed Combustion Environments", Journal of Engineering for Gas Turbines and Power, vol. 118, Jul. 1996, p. 500-506.
M. Durst et al, "The Performance of High Efficiency High Temperature Ceramic Gas Filter Elements", The Proceedings—V World Filtration Congress, 1990, pp. 1-8.
G. Parkinson, "A Hot and Dirty Future For Baghouses", Chemical Engineering, Apr. 1989, pp. 30-35.
James Hanly et al, "Equipment Selection for Solid Gas Separation", Chemical Engineering, Jul. 1993, pp. 83-85.
Paul F. Curran et al, "Gasification of Mixed Plastic Waste", Texaco Inc., Alternate Energy & Resources Department 8$^{th}$ Annual RecyclingPLAS Conference, Washington, DC, Jun. 1993, pp. 1-11.
"Thermal Incineration peripheral Systems", Hazardous Waste Processing Technology, pp. 249-255, 1982.
H. H. Ertl, "Incineration Plant For Liquid And Gaseous Chlorinated Wastes", Proceedings of the 1997 International Conference on Incineration and Thermal Treatment, Oakland, California, USA, pp. 15-17.
B. K. Gullett et al, "Role of Combustion and Sorbent Parameters in Prevention of Polychlorinated Dibenzo-p-dioxin and Polychlorinated Dibenzofuran Formation during Waste Combustion", Environmental Science and Technology, vol. 28, No. 1, Jan. 1994, pp. 107-118.
W. Gebert et al, "PCDD/F emission reduction for sinter plants", Steel Times, vol. 223, No. 6, Jun. 1995, pp. 220-222.
"Partial Oxidation Unites for PCB Elimination", Research Disclosure, No. 301, May 1989, p. 319, XP000052477, New York, USA.
Patent Abstract of Japan, vol. 099, No. 001, Jan. 29, 1999 & JP 10 281437A (Nippon Steel Corp.), Oct. 23, 1998, "Method and Apparatus for Treating Chlorine-Contaning Plastic".
For PCT/ISA/210, International Search Report, International Application No. PCT/US98/26298, Apr. 6, 1999.
Encyclopedia of Chemical Processing and Design, vol. 26, "Hydrochloric Acid" p. 396-417, 1976.
"Carbon Black, Furnace Black", Encyclopedia of Chemical Processing & Design vol. 6, pp. 212, 1988.

* cited by examiner

PRODUCTION OF ONE OR MORE USEFUL PRODUCTS FROM LESSER VALUE HALOGENATED MATERIALS

CROSS-REFERENCE TO RELATED APPLICATIONS

This application is a divisional application of U.S. application Ser. No. 10/104,703 filed on Mar. 22, 2002, now abandoned which is a continuation of U.S. application Ser. No. 09/207,792, filed on Dec. 9, 1998, now abandoned, which claims the benefit of US Provisional Application No. 60//068,405, filed Dec. 22, 1997.

BACKGROUND OF THE INVENTION

The present invention relates broadly to processes for the conversion of halogenated materials to other, higher value products and uses. More particularly, the present invention is concerned with processes and apparatus for the consumption of byproduct and waste halogenated materials, especially chlorinated hydrocarbons, and to processes for thermally or catalytically reforming waste materials in general as a means for disposing of such materials.

BRIEF DESCRIPTION OF THE ART

With regard to halogenated organic wastes, and more particularly in regards to chlorinated hydrocarbon wastes, in recent years the disposal of these materials has come under increasingly strict regulatory and environmental pressures, and correspondingly has become more expensive to accomplish.

A conventional method of disposal involves the high temperature incineration of the chlorinated hydrocarbon wastes with other chemical wastes, according to a process which is generally depicted in FIG. 1. Thus, chlorinated hydrocarbon waste liquids and gases are supplied with air and non-chlorinated hydrocarbon materials to an incinerator 10, and steam (indicated as stream 13) is generated from the hot incinerator gases in a boiler 12. A lower grade hydrochloric acid stream 14, containing from 10 to 18 weight percent of hydrogen chloride, is produced in an absorber 16 through absorption of hydrogen chloride from the incinerator gases in water (stream 18). Residual hydrogen chloride and chlorine is scrubbed from the gases in a scrubber 20 with an alkali metal hydroxide stream 22, and is neutralized, oxidized and removed in a wastewater stream 24. The scrubbed incinerator gases in stream 26 are then conveyed to the atmosphere via a blower 28 and stack 30.

Where the chemical wastes to an incinerator are substantially comprised of chlorinated hydrocarbon wastes, it has been appreciated for some time that if a more concentrated aqueous hydrochloric acid stream could be economically produced in lieu of the weak hydrochloric acid stream 14, this would be desirable for recovering some of the value which is otherwise lost in the incineration of waste chlorinated hydrocarbons. Accordingly, several processes have been proposed and are commercially available or known for producing 20 to 35 weight percent hydrochloric acid as well as still more valuable anhydrous acid. Illustrative processes are shown and summarized in Kolek, "Hydrochloric Acid Recovery Process", *Chemical Engineering Progress*, Vol. 69, No. 2, pp. 47-49(February 1973); a system developed and employed by Hoechst AG has also been described in Ertl, "Incineration Plant for Liquid and Gaseous Chlorinated Wastes", *Proceedings of the* 1997 *International Conference on Incineration and Thermal Treatment Technologies* (1997). Hoechst's system is shown in FIG. 2, and described in greater detail below.

In recent years especially, though, incineration processes in general have been progressively less favored from both an environmental and regulatory perspective, and the incineration of chlorinated materials in particular has become an even greater concern because of issues surrounding the production of trace organics such as the various dioxins and furans. Accordingly, extensive efforts have been made to develop alternative, non-combustive waste disposal processes. The processing of halogenated hydrocarbon wastes and of chlorinated hydrocarbon wastes in particular, however, has been specifically addressed in the art relating to these alternative, non-combustive waste disposal processes in only a couple of instances.

Thus, U.S. Pat. No. 5,678,244 to Shaw et al. discloses a process for dissociating wastes in a molten metal bath in the manner of U.S. Pat. Nos. 4,574,714 and 4,602,574 to Bach et al. and especially in the manner of U.S. Pat. No. 5,301,620 to Nagel et al., but wherein a fluid vitreous phase is provided which includes calcium oxide, aluminum oxide and silicon dioxide. The chlorine from a chlorine-containing waste is described as being dissociated from the chlorine-containing waste in the molten metal bath and as being captured in the fluid vitreous phase as an inorganic chlorinated compound, for eventual removal with the fluid vitreous phase in a concentrated form.

In addition to the molten metal bath waste processing technology area, a significant effort has also been devoted over a number of years to the development of waste gasification technology as an alternative to incineration. In relation to this technology area, U.S. Pat. No. 4,468,376 to Suggitt appears to most directly address the processing of halogenated organic materials. In the '376 patent, halogenated organic material is combined with a carbonaceous or hydrocarbonaceous material, a nitrogen compound and a "free oxygen containing gas" and partially oxidized at high temperatures and pressures and under reducing conditions, to produce a synthesis gas that contains hydrogen halide and ammonia in addition to hydrogen, carbon monoxide, carbon dioxide, hydrogen cyanide, water, nitrogen and entrained solids. The hydrogen halide and ammonia rich synthesis gas from the partial oxidizer is contacted with a quench medium, generally water, to which additional ammonia has been added as necessary so that a stoichiometric excess of ammonia is present in the quench medium after contact with the synthesis gas, for neutralizing the hydrogen halide in the synthesis gas. In an alternate embodiment, the synthesis gas after contact with the quench medium is further contacted with a scrubbing medium, with the scrubbing medium and quench medium together containing sufficient ammonia for neutralizing the hydrogen halide produced in the partial oxidizer.

The possibility is briefly mentioned in passing, at column 3, lines 3-14, of recovering salable hydrogen halide gas from the quench medium or combined quench and scrubbing media, on the condition that the feedstocks processed in the partial oxidizer do not contain ash or other materials beyond carbon, hydrogen, oxygen, sulfur, nitrogen and halide, by acidifying the quench medium or combined quench and scrubbing media with sulfuric acid or the like. With any reflective thought, however, one would have to discount this suggested option entirely as an impulse or afterthought; there would seem to be essentially no practical or economic sense in adding a stoichiometric excess of ammonia to neutralize the hydrogen halide in the synthesis gas, and then adding a quantity of a useful and salable material like sulfuric acid to re-acidify and recover the hydrogen chloride that had been so neutralized.

Scheidl et al., in "High Temperature Gasification (HTG) Pilot Plant Studies With Different Waste Materials: Formation of PCDD/F and Other Organic Pollutants", *Chemosphere*, vol. 23, nos. 8-10, pp. 1507-1514, 1991, reports the results of studies on an air-fed gasifier for hazardous waste materials, in which "organic compounds" like polychlorinated biphenyls (PCBs), polyvinyl chloride (PVC) and chlorinated solvents were added to the "regular waste" to evaluate principally trace organic emissions relative to conventional incineration values.

At the highest levels of addition of the supplemental chlorinated organics, a mixed solid/liquid waste feed of about 6.1 percent by weight of liquids and containing about 5.0 percent by weight overall of chlorine was processed. A gas cleaning system described for use with the gasification apparatus included an electric filter (for soot and dust removal), a scrubber for hydrogen chloride and a second scrubber for sulfuric compounds like hydrogen sulfide, carbonyl sulfide and carbon disulfide. Acid recovery thus does not appear to have been contemplated. The cleaned product gas, generally reported as containing mainly carbon monoxide (11-24 percent), hydrogen (8-14 percent), methane (0.1-0.5 percent), carbon dioxide (4-9 percent) and nitrogen (60-70 percent), is described as being useful for fuel. Overall results for trace organic emissions (for polychlorinated dibenzo-p-dioxins (PCDDs), polychlorinated dibenzofurans (PCDFs), polychlorinated biphenyls, chlorobenzenes, hlorophenols and polycyclic aromatic hydrocarbons) were viewed positively.

A process that could convert a feed comprised substantially of halogenated materials and especially byproduct and waste chlorinated hydrocarbons to one or more useful, higher value products, for example but without limitation, a useful or salable acid stream (whether aqueous or anhydrous) and/or a product synthesis gas stream useful as a fuel gas or for the synthesis of still other materials, while at the same time satisfactorily addressing the trace organic chemistry concerns associated with the known incinerative processes for accomplishing these same ends, would fill a substantial unmet need in the art.

SUMMARY OF THE PRESENT INVENTION

The present invention provides such a process, and thus relates in a first aspect to a process for converting a feed that is substantially comprised of halogenated materials to one or more useful products. These products can be in the form of a useful or salable acid product and/or a product synthesis gas as just indicated, or the reaction product (from a partial oxidation reforming step of the process) including the same hydrogen halide, carbon monoxide and hydrogen components can be employed as a feed in the synthesis of a different useful or salable product.

With particular reference to the production of an acid product and/or a product synthesis gas, the process of the present invention comprises the steps of supplying a partial oxidation reforming reactor zone (comprised of one or more partial oxidation reforming reactors in series or in parallel) operating under reducing conditions with the feed, a source of oxygen and optionally a supplemental hydrogen-containing co-feed as required to enable the conversion of substantially all of the halogenated materials in the feed to a corresponding hydrogen halide, recovering from the reactor a reaction product comprised of one or more hydrogen halides, water, carbon monoxide and hydrogen but containing essentially no unconverted halogenated materials, and then separating out and recovering without an intervening neutralization step from the reaction product either or both of a useable or salable halogen acid product in aqueous or anhydrous form and the product synthesis gas. Where the desired useful product is neither an acid derivable from the reaction product or the product synthesis gas, but instead is a material which can be prepared or synthesized from the reaction product as a whole, neither of the acid product or product synthesis gas are recovered and the reaction product is used as a feed in the synthesis of the material in question.

In a second broad aspect, the present invention relates to an apparatus useful for accomplishing the process of the present invention. In a first embodiment related to the use of the reaction product on the whole as a feed in the synthesis of a different material, the apparatus of the present invention comprises a partial oxidation reforming reactor zone (which can be one partial oxidation reforming reactor or can include a plurality of such reactors in series or in parallel), a hydrogen halide quench cooling apparatus for quenching the reaction product from the partial oxidation reforming reactor zone, a carbonaceous soot and inorganic ash purge for removing soot and ash from the reaction product, and a reactor wherein the reaction product is further reacted or chemically converted to the desired material. In a second embodiment directed to the preparation and recovery of one or more halogen acid products and/or a product synthesis gas per se from the reaction product, the apparatus of the present invention comprises a partial oxidation reforming reactor zone, a hydrogen halide quench cooling apparatus, a carbonaceous soot and inorganic ash purge, an absorber for absorbing hydrogen halide in the reaction product into a hydrogen halide-lean aqueous solution to produce a more concentrated hydrogen halide acid solution as a bottoms stream, and a stripper for receiving the absorber overheads and neutralizing residual hydrogen halide in the overheads.

Figure 1:
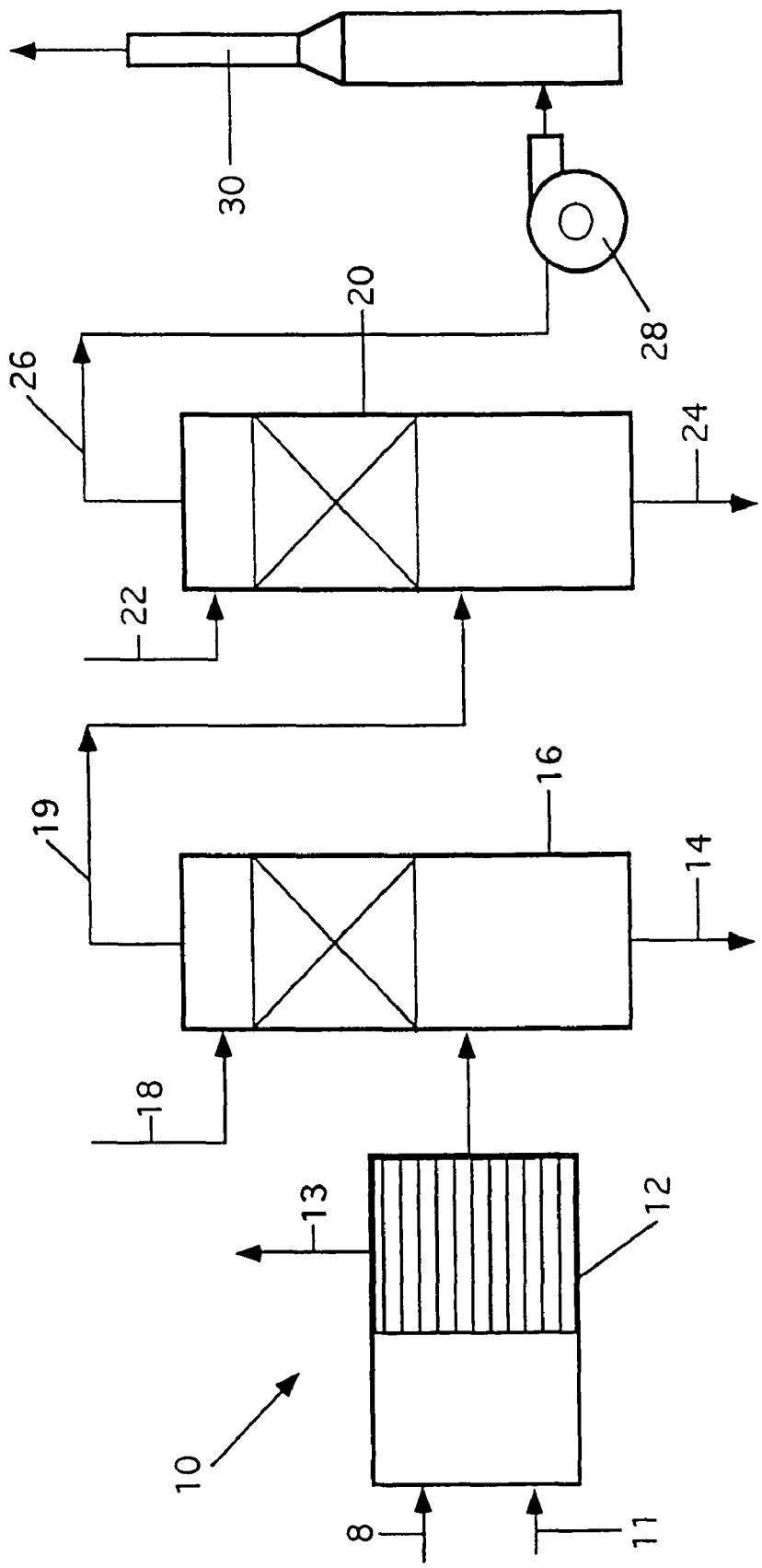
FIG. 1 is a schematic depiction of a conventional incineration process and apparatus for the incineration of waste chlorinated hydrocarbons, in which weak hydrochloric acid and steam are produced for use elsewhere.

DETAILED DESCRIPTION OF THE DRAWINGS AND OF THE PREFERRED EMBODIMENTS OF THE INVENTION

The process and apparatus of the present invention, in their preferred embodiments, relate to the conversion of byproduct and waste chlorinated hydrocarbons to one or more useful, higher value products, particularly an anhydrous hydrogen chloride product that can be sold or used in the oxychlorination step of an EDC/VCM manufacturing process.

Those skilled in the art will of course readily appreciate that the process and apparatus of the present invention are useful for the conversion of a variety of halogenated materials to higher value products, including the conversion of fully halogenated materials such as carbon tetrachloride that are themselves commercially manufactured, sold and consumed as "chemical products", to higher value products inclusive of the corresponding halogen acids, a product synthesis gas useful as a fuel or as a feedstock for the synthesis of another material, those materials which may be so prepared using the product synthesis gas, a component isolated or recovered from the product synthesis gas, and materials which may be prepared from a hydrogen halide or halides with one or more additional components of the reaction product gas stream from the partial oxidation reforming reactor zone. Feeds comprised of a mixture of differently halogenated materials, for example, chlorofluorocarbons and/or hydrochlorofluorocarbons with chlorinated hydrocarbons, are also contemplated, as are feeds including both liquids and solids. Preferably however the feed will be comprised substantially entirely of liquids, and more preferably will be essentially ash-free and non-slagging, including less than about 5 percent of ash and other inorganic materials, and preferably including about 1 percent or less of such materials.

In the broader context where the process and apparatus of the present invention will be called upon to process differently halogenated materials, the feed will be comprised "substantially" of such halogenated materials. By "substantially", it is intended that the halogen content of the feed overall (including any hydrogen-containing co-feed as may be required to supplement the hydrogen content in the halogenated materials for removing substantially all of the halogen content to the corresponding hydrogen halide(s)) will be such that if a single halogen were implicated in the feed, recovery of the corresponding hydrogen halide would generally be considered commercially practical. "Differently halogenated materials", parenthetically, should be understood as embracing both the circumstance wherein discrete materials each containing a single, distinct species of halogen atom are included in the feed, and the circumstance wherein a single material contains more than one species of halogen (chlorofluorocarbons and hydrochlorofluorocarbons, for example) is present in the feed.

One potential, commercially significant application of the process of the present invention as regards these differently halogenated materials would be for processing chlorine and fluorine containing materials, for example, chlorine and fluorine containing intermediates from agricultural chemical production and especially stockpiled waste or byproduct chlorofluorocarbons, the use of which has been largely curtailed in recent years because of concern over the effect of such materials on atmospheric ozone levels. The processing of these types of feeds clearly entails specific materials of construction considerations because of the very high corrosivity of hydrogen fluoride, though absorption of HF/HCl mixtures is routinely performed by companies manufacturing chlorofluorocarbons and those skilled in this particular art area are accordingly able to deal with these issues. The separation of HF from HF/HCl acid mixtures, for accomplishing a reasonable recovery either of the HF or HCl in commercially desired concentrations, appears to have been the subject of significant development efforts though some technologies are known to the art, see, for example, U.S. Pat. No. 4,714,604 to Olson, said patent being incorporated herein by reference (describing the conversion of HF in an HF/HCl mixture to $SiF_4$, enhancing the relative volatility of $SiF_4$ relative to the HCl, then distilling the $SiF_4$/HCl mixture to yield a concentrated (22 to 40 percent) HCl acid solution).

A preferred application of the process and apparatus of the present invention will, again, be for the conversion of a feed comprised substantially entirely of byproduct and waste chlorinated materials and especially chlorinated hydrocarbons, for example, in the form of heavy and light distillation fractions from a chlor-alkali manufacturing process, from the manufacture of ethylene dichloride and vinyl chloride monomer or of chlorinated solvents, or from the manufacture of olefin oxides via a chlorohydrin intermediate, polychlorinated biphenyl-contaminated transformer oils and heat transfer fluids, chlorinated pesticide and herbicide wastes and waste chlorinated solvents. In general, the feed will contain more than about 15 percent by total weight of chlorine, but preferably will contain at least about 30 percent, more preferably about 40 percent by weight and most preferably will contain about 50 percent or more by total weight of chlorine.

For simplicity and clarity of explanation, the process and apparatus of the present invention will be described hereafter in relation to this preferred and non-limiting application or context.

As has been mentioned previously, one method known to the art for disposing of such materials is a shown in FIG. 1. Referring now to FIG. 1, and as summarized above, chlorinated hydrocarbon waste liquids and process vents are supplied in a stream 8 to a conventional incinerator 10 with air and optionally additional non-chlorinated hydrocarbon materials, for example, methane, in a stream 11. The heat of combustion is employed in boiler 12 for generating steam 13, and a cool effluent gas stream is then passed to absorber 16 wherein hydrogen chloride in the effluent gas is absorbed into water supplied by stream 18 and produces a weak hydrochloric acid stream 14 containing generally from about 10 to about 18 percent by weight of hydrogen chloride. Any residual hydrogen chloride remaining in the overheads 19 from the absorber 16 is neutralized in a scrubber 20 with alkali metal hydroxide (typically caustic soda) supplied in stream 22, and disposed of in a waste water stream 24. The remaining incineration gases 26 are discharged via blower 28 and a stack 30.

Figure 2:
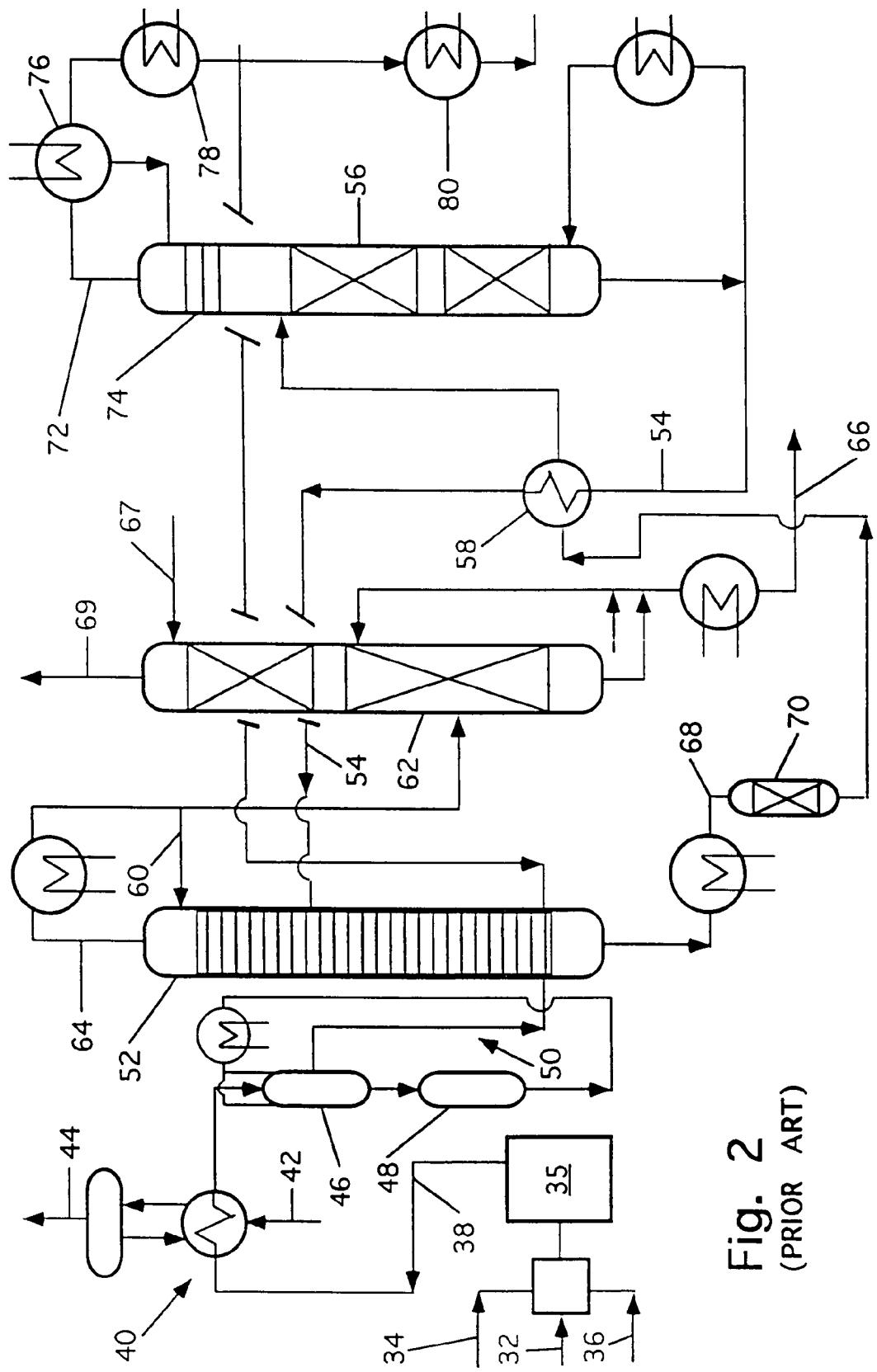
FIG. 2 depicts an incineration process which has been developed and commercially employed and licensed by Hoechst AG for incinerating waste chlorinated hydrocarbons from an associated ethylene dichloride (EDC)/vinyl chloride monomer (VCM) production facility, and which contemplates the recovery of anhydrous hydrogen chloride as a feed and raw material for the oxychlorination process in the EDC/VCM production facility.

A commercial incineration process developed by Hoechst AG for incinerating chlorinated hydrocarbon wastes in particular is shown in FIG. 2, and recovers the chlorine value of the chlorinated hydrocarbon wastes in the form of a gaseous anhydrous hydrogen chloride which is suited for use in the oxychlorination portion of an associated EDC/VCM manufacturing plant.

Liquid chlorinated hydrocarbon wastes in stream 32 are fed to a nozzle via residue filters, with a gaseous chlorinated hydrocarbon waste 34 being fed directly to the incineration chamber 35. The waste is atomized with compressed air from stream 36 in the nozzle and incinerated at about 0.2 bars, gauge and 1250 degrees Celsius with from 4 to 5 percent of excess oxygen. To maintain or limit the incinerator temperature, supplemental heating with natural gas or addition of water or preferably aqueous hydrochloric acid to the incinerator chamber, respectively, are suggested.

The flue gas 38 from the incinerator passes through a boiler 40 wherein boiler feed water 42 is converted to steam 44 and the temperature of the flue gases decreased to about 300 degrees Celsius. The steam generated is fed into the steam system of an associated EDC/VCM plant at a pressure of 8 bars absolute, and a small fraction of the boiler feed water 42 is purged to limit the salt concentration in the steam drum.

The flue gas 38 leaving the boiler 40 is then quenched with hydrochloric acid in a quench chamber 46 to approximately 60 to 70 degrees Celsius, with a residue filter being provided in the quench recycle system 48 to remove solids (for example, ash and metals) from the quench system.

The flue gas 50 exiting the quench system is then supplied to an absorber column 52 equipped with bubble cap trays. Aqueous hydrochloric acid at an azeotropic composition of about 17 percent by weight is supplied in a stream 54 from a desorber 56, via heat exchangers 58 at a temperature of about 90 degrees Celsius. The HCl concentration increases in the absorber 52 from its azeotropic value to a value of about 25 to about 28 percent by weight at the bottom of the absorber 52. The remaining HCl in the gas is removed, except for small amounts, in the upper part of the absorber 52 where the gas therein is contacted with condensate in stream 60. Before entering scrubber 62, water vapor in the off-gas 64 from the absorber 52 is reduced in the top condenser to a value corresponding to a temperature of about 35 degrees Celsius.

The scrubber 62 is described as being comprised of a lower section wherein most of the remaining HCl and free chlorine in the off-gas 64 is neutralized with 18 weight percent sodium hydroxide in water, and then removed in a wastewater stream 66. Traces of HCl still left in the gas phase are still further reduced in an upper section of the scrubber 62 by absorption into demineralized water via stream 67, and the flue gas 69 emitted to the atmosphere at about 25 degrees Celsius.

The acid stream from the bottom of the absorber 52, containing from about 25 to about 28 weight percent of hydrogen chloride in water, is passed through filtration and ion exchange in vessel 70 to remove residual solids and metal chlorides, before entering the desorber 56 at about 120 degrees Celsius. The desorber 56, which operates at a pressure of 4.5 bars, gauge, in contrast to the various other apparatus operating in atmospheric pressure, functions to distill the stream 68 and produce the aqueous, azeotropic HCl stream 54 and an overhead stream 72 which, after passing through a demister 74 at the top of desorber 56, is dried through two condensers 76 and 78. The second condenser 78 employs refrigeration to reduce the temperature of the gas stream 72 to −12 degrees Celsius whereupon the resulting anhydrous hydrogen chloride gas stream is heated in exchanger 80 to a temperature in excess of the dew point, typically being about 60 degrees Celsius, and supplied to the oxychlorination portion of the associated EDC/VCM plant.

Figure 3:
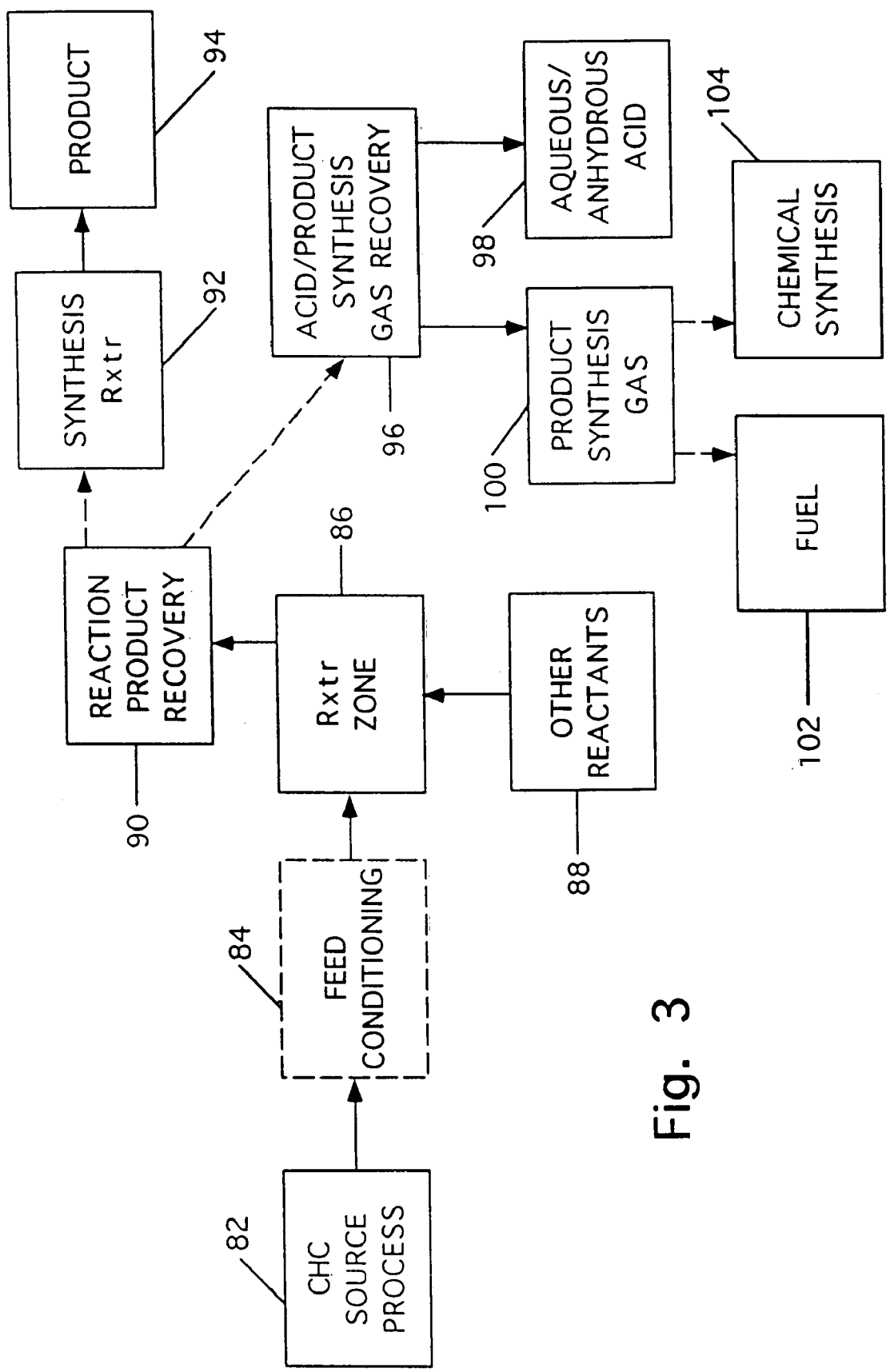
FIG. 3 provides an overall schematic of a process of the present invention, in each of two preferred embodiments.

Referring now to FIG. 3, a process of the present invention is broadly schematically illustrated in each of two preferred embodiments. Chlorinated hydrocarbon waste products and byproducts in a stream from a chlorinated hydrocarbon waste- or byproduct-generating or source process 82 are communicated to an optional feed conditioning system 84, with the necessity of using the feed conditioning system 84 depending in part on the nature of the chlorinated hydrocarbon waste products and byproducts received from the source process 82 and in part on the design and capability of the partial oxidation reforming reactor zone 86 and associated apparatus to process particulate matter or solids found in the feed to a benign end. As indicated above, the process of the present invention will preferably act upon a feed comprised substantially entirely of chlorinated materials that are liquid in nature; in actual practice, however, a number of the particular chlorinated hydrocarbon waste products and byproducts enumerated above can be expected to contain some particulate matter. Further, to the extent provision has been made for the presence of such particulate matter in the feed for example as a consequence of normal operation of the source process(es), it is anticipated that one may purposely add into the feed dioxin- and furan-laden particulates that derive from other sources and that can be processed to destruction in the process and apparatus of the present invention.

Figure 4:
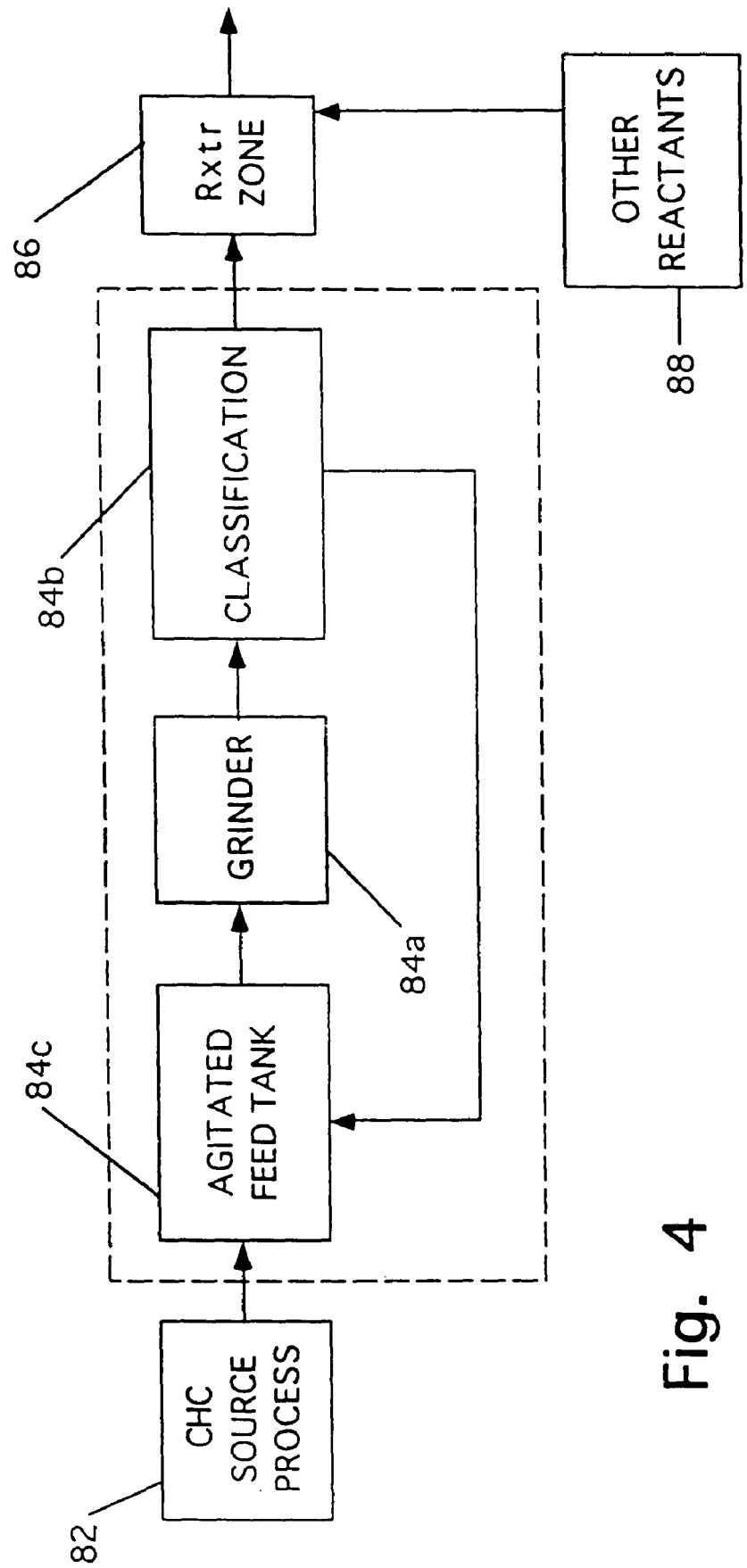
FIG. 4 schematically shows a portion of the process of FIG. 3, pertaining to a feed conditioning step which is preferred for the processing of certain types of feeds.

Preferably for both product quality and environmental reasons, this particulate matter will be completely reformed or gasified in the partial oxidation reforming reactor zone 86, whether on a single pass basis or through recycle with carbonaceous soot and insoluble inorganic ash removed by a particulate removal step (as described below). To this end, it is preferred then that any solids present in the feed to the partial oxidation reforming reactor zone 86 will be smaller than about 2 millimeters in size. More preferably, any particulate solids in the feed will be smaller than about 500 microns in size, but more preferably the particulate solids should be smaller than 200 microns in size and most preferably will be smaller than about 100 microns in size.

Where the chlorinated hydrocarbon feed contains particulate solids of an undesirable size, a feed conditioning step 84 is consequently included which, as shown in greater detail in FIG. 4, comprises the steps of grinding a part or the whole of the feed in a grinder 84a to meet the indicated particulate solids size limitation, using a classification device 84b internal to the grinder 84a or located downstream thereof for permitting only those particulate solids meeting the indicated size limitation to be passed to the partial oxidation reforming reactor zone 86, and recycling larger particulate solids to an agitated feed tank 84c for being supplied to the grinder 84a anew. The classification device 84b is preferably a filter.

After being conditioned as appropriate in the optional feed conditioning step 84, the feed is supplied to a partial oxidation reforming reactor zone 86 operating under reducing conditions with an oxygen source (preferably in the form of one or more oxygen-containing gases selected from oxygen, air, oxygen-enriched air and carbon dioxide, but more preferably being essentially oxygen) and optionally a supplemental hydrogen-containing co-feed (the oxygen source and optional hydrogen-containing co-feed being indicated in FIG. 3 as "other reactants" 88) as required to enable substantially all of the chlorine content in the feed to be manifested as hydrogen chloride in the reaction product from the partial oxidation reforming reactor zone 86. Steam can be added as a temperature moderator and additional hydrogen source in keeping with conventional reformer practice, and should be considered as optionally included in the "other reactants" 88.

From the reactor zone 86, the reaction product is supplied to a reaction product recovery step 90, and thereafter the reaction product may be supplied to a separate synthesis step 92 to produce a chemical product 94 such as phosgene or methyl chloride (as taught in commonly-assigned U.S. Pat. No. 4,962,247 to Holbrook et al., which patent is incorporated herein by reference). Alternatively, the reaction product is supplied to an acid and product synthesis gas recovery step 96 for recovering either or both of an aqueous or anhydrous hydrogen chloride product 98 and a product synthesis gas 100, which product synthesis gas 100 is then used as a fuel 102 or as a feed 104 for chemical synthesis of such materials as ammonia, methanol, hydrogen, acetic acid or acetic anhydride by commercially-known processes, see, for example, Kirk-Othmer, *Encyclopedia of Chemical Technology*, $3^{rd}$ ed., vol. 2, pp. 480-500 (ammonia), Kirk-Othmer, *Encyclopedia of Chemical Technology*, $4^{th}$ ed., vol. 13, pp. 852-878 (hydrogen), McKetta and Cunningham, *Encyclopedia of Chemical Processing and Design*, vol. 29, pp. 423-435 (1988) (methanol).

Those skilled in the art will recognize, of course, that other materials than these could be produced from the reaction product or from the product synthesis gas 100 recovered from the reaction product, and the exemplary materials listed are not intended to be limiting. An example of another such material would be 1,3-propanediol as prepared in the manner of several related patents assigned to Shell Oil Company, see U.S. Pat. No. 5,463,144 to Powell et al., U.S. Pat. No. 5,463,145 to Powell et al. and U.S. Pat. No. 5,463,146 to Slaugh et al., all of which are incorporated herein by reference and all of which relate to the catalytic hydroformylation of ethylene oxide with carbon monoxide and hydrogen in a non-water-miscible organic solvent, extracting 3-hydroxypropanal from the organic solvent into an aqueous liquid phase at high concentrations, separating the aqueous phase from the organic phase containing the hydroformylation catalyst, contacting the aqueous phase with hydrogen in the presence of a hydrogenation catalyst to provide a hydrogenation product mixture including 1,3-propanediol, then recovering 1,3-propanediol from the hydrogenation product mixture and returning at least a portion of the organic phase to the first, hydroformylation step of the process.

Figure 5:
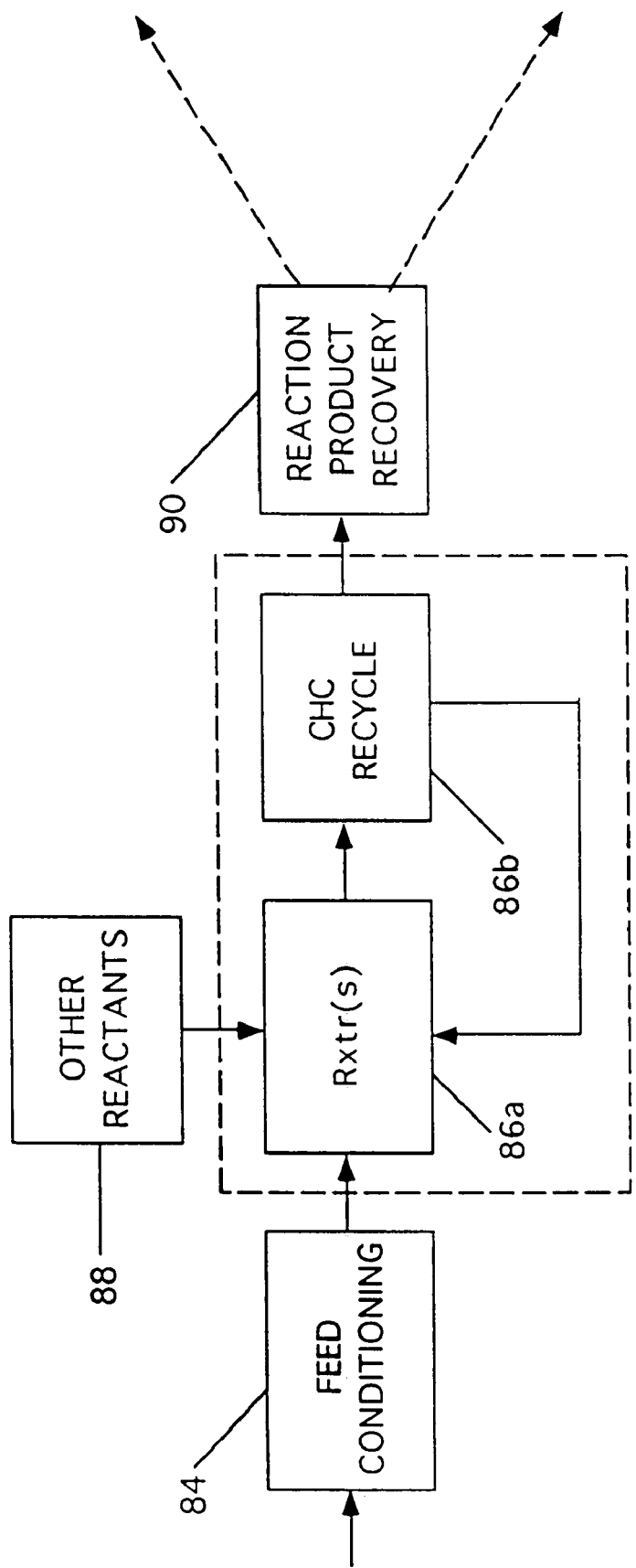
FIG. 5 provides a schematic of the reactor zone portion of the process of FIG. 3.

Referring to FIG. 5, additional details of the reactor zone 86 are shown in a more specific or detailed schematic drawing. In the reactor zone 86, one or more partial oxidation reforming reactors 86*a* are used in parallel or in series to convert the chlorinated hydrocarbon wastes and byproducts to a reaction product including hydrogen chloride, carbon monoxide, hydrogen and water. While preferably the reactor(s) 86*a* employed in the reactor zone 86 will be designed so as to provide full conversion of the chlorinated hydrocarbons in the feed to hydrogen chloride and with no opportunity for bypassing of unconverted materials to a quench section or to downstream apparatus generally, because reforming processes of the type described herein involve an equilibrium among a number of competing reactions and because the process of the present invention may and likely will see a wide variety of chlorinated materials, some of which may be more difficult to convert than others, we contemplate generally that a separation step 86*b* may be employed after the one or more partial oxidation reforming reactors 86*a* to recover and recycle any unconverted chlorinated materials that may otherwise be contained in the reaction product. Preferably, this recycle step 86*b* is simply accomplished by means of the particulate removal included in the reaction product recovery step 90, so that the recycle step 86*b* in effect overlaps with the reaction product recovery step 90 shown schematically in more detail in FIGS. 6 through 10.

Figure 6:
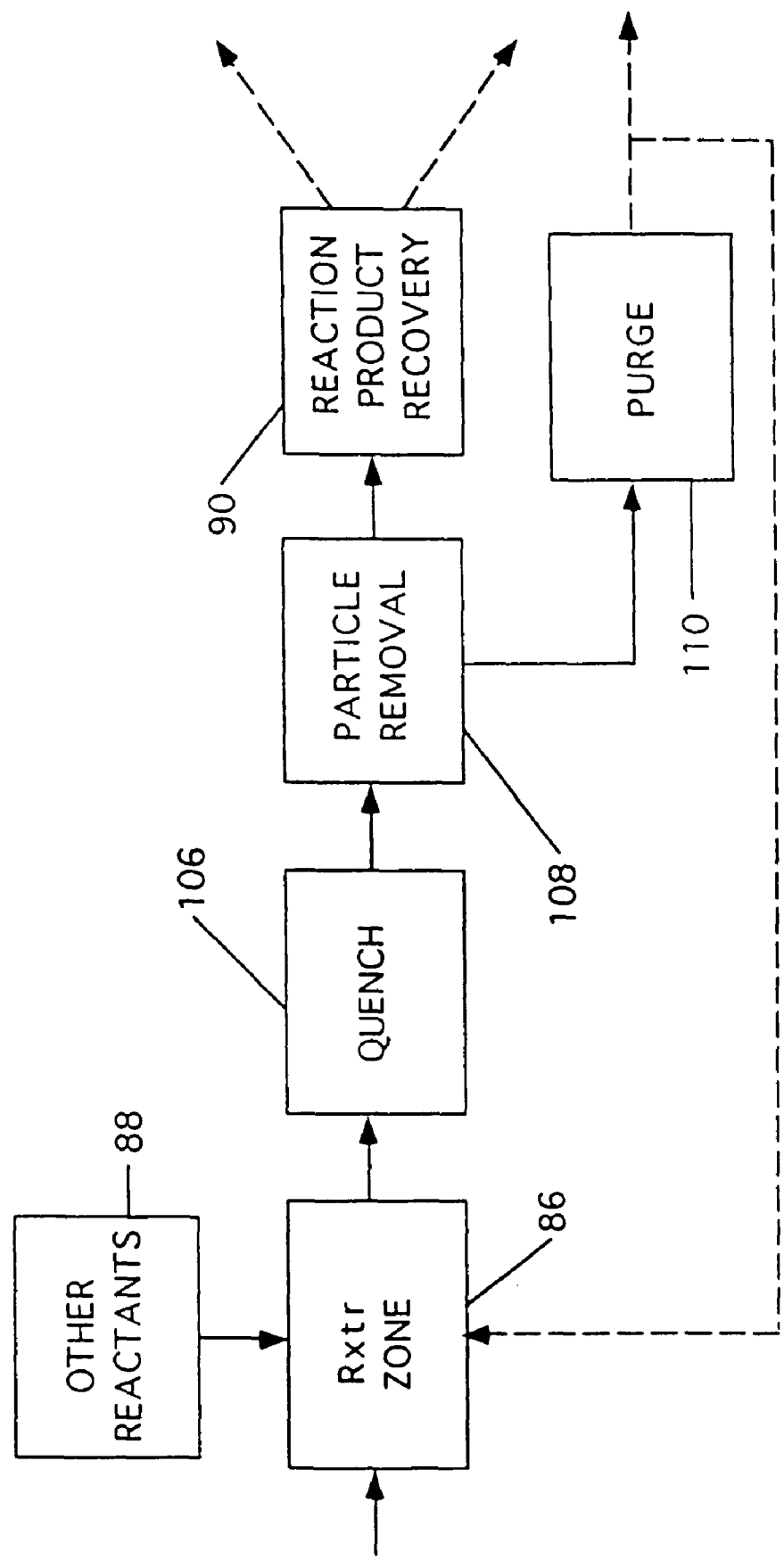
FIG. 6 provides a schematic of the reaction product recovery section of the process of FIG. 3, in a first embodiment.

With regard to FIG. 6, a reaction product recovery step 90 in a first preferred embodiment includes a wet gas quench step 106 in which the reaction products are supplied to a hydrogen chloride quench cooling apparatus, which may be any conventional apparatus used for this purpose. For example, a spray cooler may be used, or a conventional draft tube/submerged quench tube apparatus may be used, or an overflow weir quench or a venturi quench, or any combination of the above. For present purposes it is preferred that a combination is used of an overflow weir quench, for managing the hot gas/cold liquid interface and the corrosion issues attendant to the production of significant amounts of hydrogen chloride in the reaction product, and of a high energy venturi quench/scrubber for effective carbonaceous soot and acid-insoluble inorganic ash removal in a particulate removal step 108. Carbonaceous soot and inorganic ash removed from the quenched reaction product are then in a step 110 purged from the system or recycled in whole or in part to the reactor zone in a similar manner as taught in U.S. Pat. No. 3,979,188 to McCallister and U.S. Pat. No. 3,607,157 to Schlinger et al., both of which are incorporated by reference, so that unconverted chlorinated hydrocarbons with or on the soot or ash are recycled as just described above.

Figure 7:
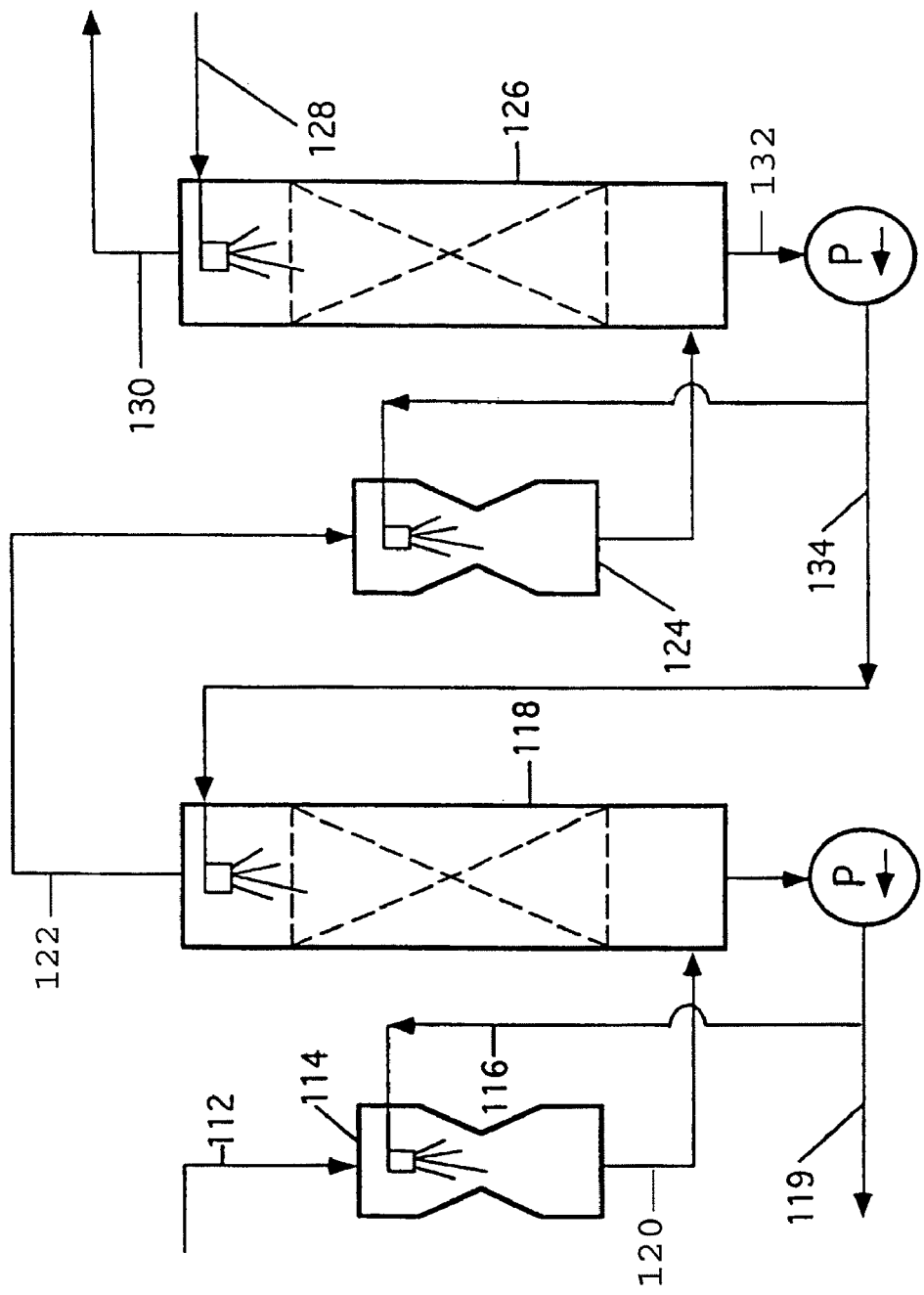
FIG. 7 illustrates one possible means for carrying out the reaction product recovery step according to the first embodiment shown schematically in FIG. 6.

A particular quench and particulate removal scheme is shown in FIG. 7 for carrying out the process steps shown schematically in FIG. 6, and involves the use of flux force/condensation scrubbing as the principal particulate removal means. The reaction product gas 112 from the partial oxidation reforming reactor zone 86 is first quenched in a low energy quench 114 (which can be an overflow weir quench or other conventionally known low energy quench device) with the particulate-bearing, acid effluent 116 from a packed condenser column 118, which column 118 in turn receives the quenched reaction product stream 120 from the low energy quench 114 as a feed. Particulate matter removed from the reaction product stream via the condenser acid effluent is periodically or continuously purged or recycled in stream 119 as has been previously described, and the thus-scrubbed reaction product gas 122 is then passed to a high energy venturi quench/scrubber 124 for scrubbing residual carbonaceous soot or inorganic ash particulate matter from the desired reaction product stream. A packed demister column 126 supplied with make-up water 128 or with cold hydrochloric acid from a subsequent acid absorber and/or in the form of a filtrate from still-subsequent conventional aqueous acid clean-up operates to further remove particulate matter, and especially any entrained particulate matter from the high energy venturi quench/scrubber 124, from the desired reaction products going overhead in stream 130 to acid/product synthesis gas separation and recovery (step 96 in FIG. 3). The bottoms stream 132 from the demister column 126 is used in part in the high energy venturi quench/scrubber 124, and in part as the scrubbing liquid 134 supplied to the packed condenser column 118.

Figure 8:
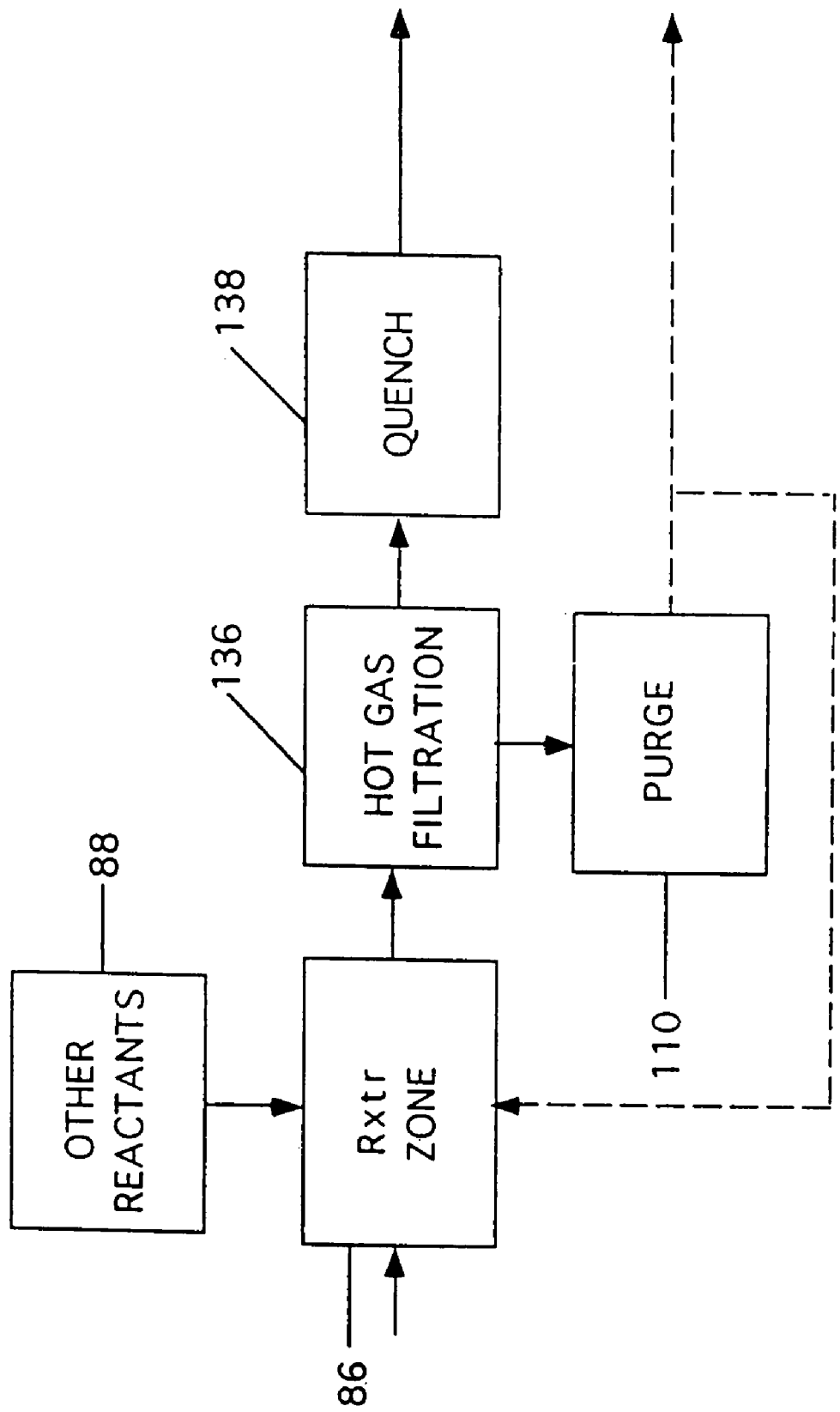
FIG. 8 is a schematic of an alternative embodiment of the reaction product recovery portion of the process of FIG. 3.

Referring now to FIG. 8, an alternative embodiment of the reaction product recovery section 90 is shown in schematic, in which a hot gas filtration and particulate removal apparatus 136 is employed preceding a principal quench cooling apparatus 138. The hot gas filtration apparatus 136 will preferably be of a type well known to those skilled in the art for use in hot, corrosive environments from applications in the chemical process, petroleum refining and mineral processing industries, involving the use of a ceramic filter medium as generally described in U.S. Pat. No. 5,460,637 to Connolly et al., Judkins et al., "Development of Ceramic Composite Hot-Gas Filters", *Journal of Engineering for Gas Turbines and Power*, vol. 118, pp. 495-499 (July 1996)(and the references cited therein), and in Judkins et al., "A Review of the Efficacy of Silicon Carbide Hot-Gas Filters in Coal Gasification and Pressurized Fluidized Bed Combustion Environments", *Journal of Engineering for Gas Turbines and Power*, vol. 118, pp. 500-506 (July 1996) (with the references cited therein), or involving the use of a sintered metal filter as described for example in Bulletin GSS-1, "The Pall Gas Solid Separation System for the Chemical Process, Refining, and Mineral Industries", Pall Corporation (1988). As in FIG. 6, the soot and inorganic ash which are not dissolved in the hydrogen chloride acid products are purged from the system or recycled in whole or in part to the reactor zone 86. A variation of the embodiment shown in FIG. 8 employs a partial quench (by spray cooling or contact with a cooled gas, for example, a cooled, recycled product synthesis gas) of the reaction product stream from a temperature in the partial oxidation reforming reactor zone of from about 1100 to about 1500 degrees Celsius to a temperature in the range of about 800 degrees Celsius and less, for example, and especially being as low as about 550 to about 600 degrees Celsius, that allows for a larger selection of materials of construction and may be less demanding of the filtration apparatus in practice.

Figure 9:
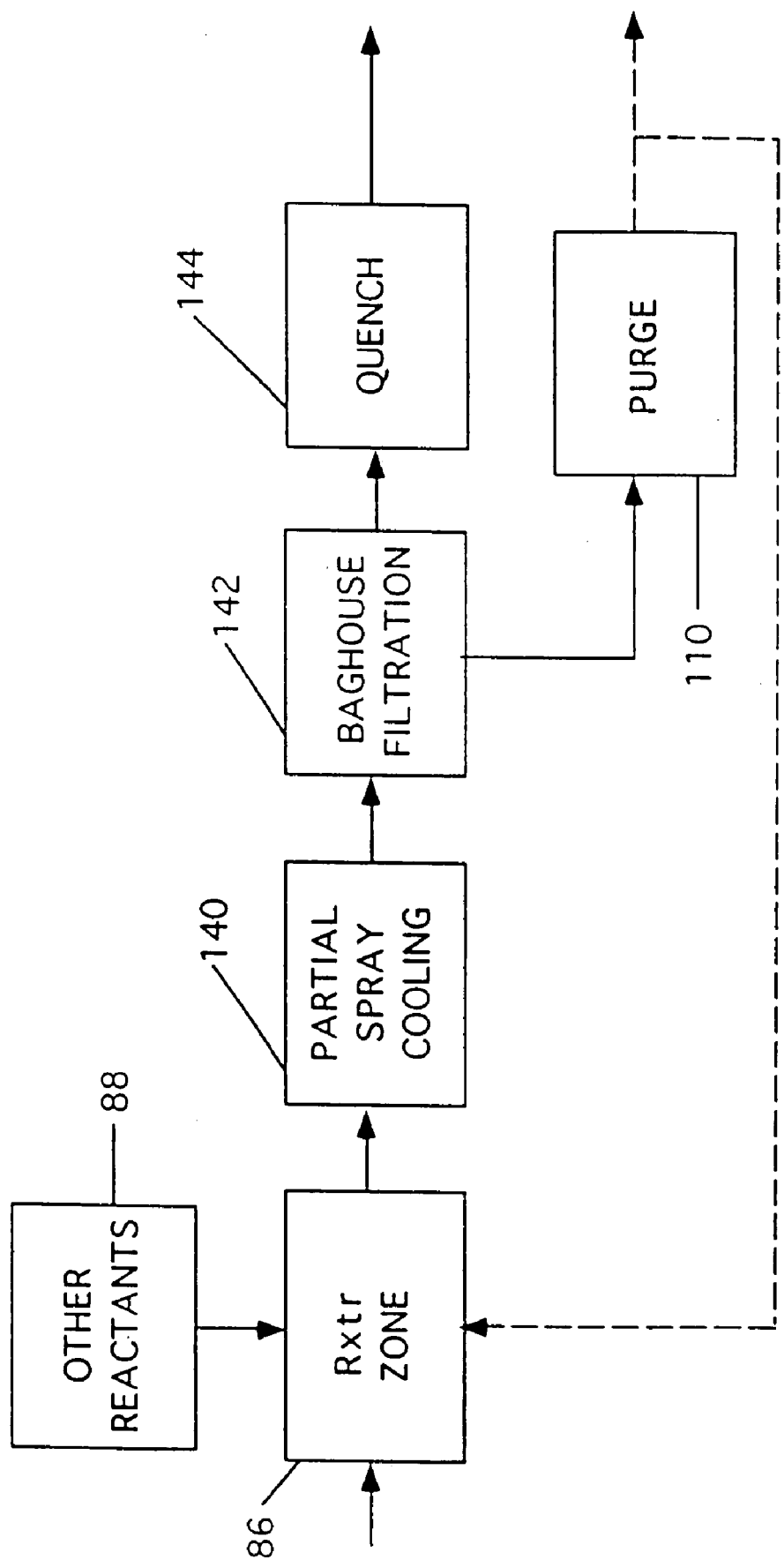
FIG. 9 is a schematic of still another alternative embodiment of the reaction product recovery section of the process of FIG. 3, as shown in other embodiments in FIGS. 6 and 8.

FIG. 9 depicts a second alternative embodiment of the reaction product recovery section 90 in schematic. This second alternative embodiment employs a partial spray cooling or low energy quench 140 of the reaction products from a temperature in the partial oxidation reforming reactor zone of from about 1100 to about 1500 degrees Celsius, to a temperature now suited to particulate removal of the carbonaceous soot and insoluble inorganic ash in a baghouse filtration apparatus, conventionally being from at least about 200 degrees Celsius (or safely above the dew point of hydrogen chloride in the environment of the baghouse filtration apparatus) to about 400 degrees Celsius. The thus-cooled reaction products are conveyed to a baghouse filtration apparatus 142 from which soot and inorganic ash are again purged from the system, and the gases from which the inorganic ash and soot have been removed are then conveyed to a second spray cooling/low energy quench apparatus 144 for further cooling the desired reaction products as appropriate for the synthesis reactor 92 or for the acid and product synthesis gas recovery section 96 schematically shown in the process of FIG. 3. Those familiar with the manufacture of carbon black will appreciate that in this embodiment, the reaction product recovery section 90 and particulate removal demands of the process of the present invention bear some resemblance to the known manufacturing and recovery technologies for carbon black. In this regard, for example, it is considered that a bag filter design as shown in FIG. 19 of McKetta and Cunningham, "Carbon Black, Furnace Black", *Encyclopedia of Chemical Processing and Design*, vol. 6, page 212 (1988), may suitably be used in the context of the present invention as well. The selection and design of a suitable baghouse filtration apparatus 142 are again considered to be matters within the capabilities of those skilled in the art, see, for example, Croom, "Effective Selection of Filter Dust Collectors", *Chemical Engineering*, pp. 86-91 (July 1993).

Figure 10:
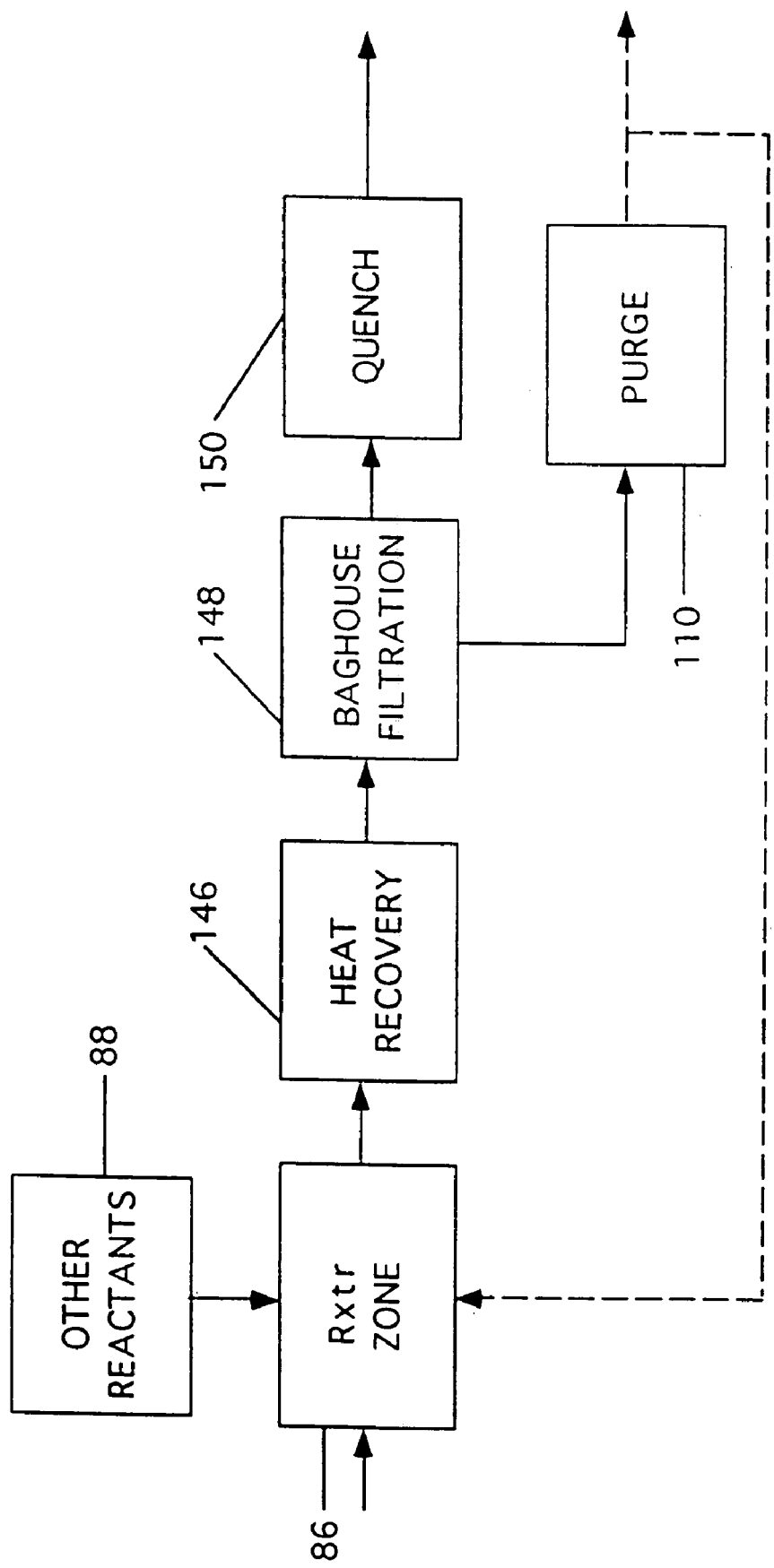
FIG. 10 provides still another embodiment of a reaction product recovery section.

Finally, referring now to FIG. 10, still a third alternative embodiment of the reaction product recovery section 90 is shown, which uses a heat recovery unit 146 to generate steam and to cool the reaction products from the reactor zone 86 to a baghouse-suitable temperature. After being filtered in a baghouse filtration apparats 148, the filtered reaction products are then conveyed again to a second quench cooling apparatus 150 for further cooling the reaction products to a suitable temperature for the synthesis reactor 92 or for the acid and product synthesis gas recovery section 96 shown in FIG. 3. The heat recovery unit 146 can conveniently be a boiler such as has been used previously in the incineration of chlorinated hydrocarbon wastes. An example of a suitable boiler in this context can be found in U.S. Pat. No. 4,627,388 to Buice, which patent is incorporated herein by reference. Alternatively, a radiant heat recovery boiler such as disclosed in U.S. Pat. No. 4,889,657 to Jahnke may be used as desired.

As should be clear from the preceding paragraphs, a variety of hydrogen halide quench cooling and particulate removal arrangements and apparatus can be employed in the process of the present invention, depending on such considerations as the nature of the feeds to be processed in a given apparatus, and the character and quantity of the particulate matter produced therefrom.

In general terms, and in the preferred processing of a feed comprised substantially entirely of chlorinated materials and especially byproduct and waste chlorinated hydrocarbons, the embodiment shown in FIG. 6 may be preferred by some users from the perspective of preventing the de novo synthesis or any possible reformation of dioxins, furans and related trace organics, by providing a rapid quench of the reaction product gases. In this regard, in oxidative incineration environments a rapid quench has generally been found useful in reducing dioxin and furan emissions in stack gases, see, for example, U.S. Pat. No. 5,434,337 to Kiss, Gebert et al., "PCDD/F Emission Reduction for Sinter Plants", *Steel Times*, vol. 223, no. 6, pp. 220-222 (Jun. 6, 1995), Gullett et al., "Role of Combustion and Sorbent Parameters in Prevention of Polychlorinated Dibenzo-p-dioxin and Polychlorinated Dibenzofuran Formation During Waste Combustion", *Environmental Science and Technology*, vol. 28, no. 1, pp. 107-118 (Jan. 1994).

The Scheidl et al. article discussed above suggests that a reforming process as contemplated herein should represent an improvement over conventional incineration, insofar as dioxin and furan formation issues are concerned. Indeed, as indicated previously, it is anticipated that the process of the present invention could desirably be used to process dioxin- and furan-containing materials to destruction. Given that the process of the present invention may in certain commercial environments be called upon to process a wide variety of feeds, however, and further given the much higher chlorine contents of the feeds contemplated for use in the present invention compared to those reported in the Scheidl et al. article, with the regulatory, political and environmental sensitivities attending the disposition of chlorinated organic wastes and surrounding trace organic emissions, it is recognized that a rapid wet gas quench may be a desirable additional safeguard for some users to employ.

An apparent potential disadvantage of the embodiments of FIG. 6 and FIG. 7, however, relative to the embodiments of FIGS. 8 through 10, is that the removal and purging from the process of wetted or slurried particulate materials can be expected to be more difficult to accomplish. From a purely technical perspective, then, a dry gas filtration system as schematically shown in FIGS. 8 through 10 and as described above will be preferred to the wet gas quench and particulate removal embodiments of FIGS. 6 and 7, with the embodiments of FIGS. 9 and 10 being generally further preferred to a hot gas filtration method as shown in FIG. 8.

The reactors 86*a* which are used in the present invention can be designed in a variety of different configurations, the basic considerations for the reactor design being to provide for complete conversion of the halogenated materials therein to reaction products including the corresponding hydrogen halide(s) (that is, substantially all of the halogens in the feed are found in the reaction product as hydrogen halide(s)), and to substantially not allow any bypassing of unconverted materials from the feed to the quench inlet or other downstream equipment. Fundamentally, any of the reactor designs which have been known for reforming low ash/low slag-forming feeds may be useful in the present invention, depending on the capacity of these designs to meet the above-stated conditions for a projected feed or set of feeds.

Figure 11:
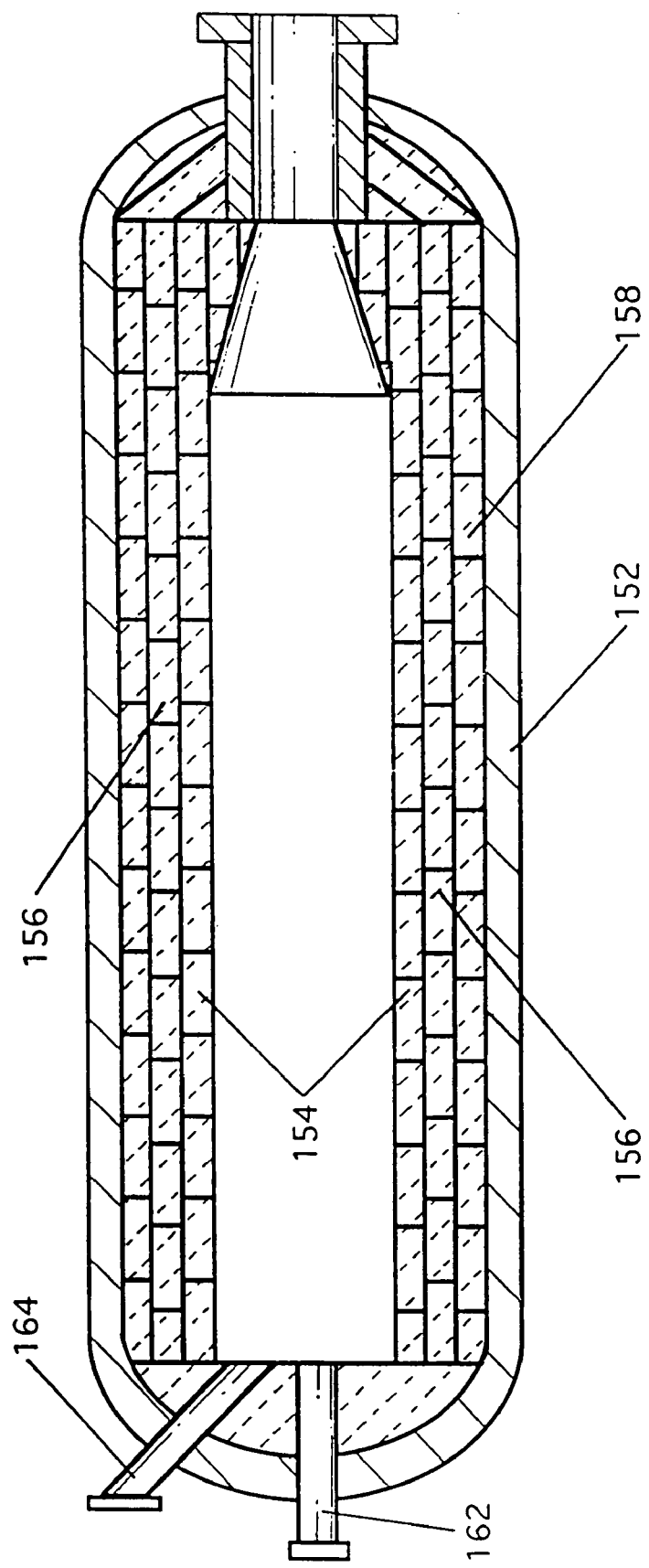
FIG. 11 depicts a partial oxidation reforming reactor as may be used in the process of FIG. 3, in one preferred embodiment.

A first, generally conventional design is shown in FIG. 11, and shows a cylindrical pressure vessel 152 which is lined with refractory brick layer 154, the refractory layer 154 preferably being characterized by a high alumina content of at least about 90 percent by weight of alumina. An insulating brick layer 156 is also provided, and a protective mastic cement coating/lining (not shown) and acid tile brick layer 158 underlie the insulating brick layer for protecting the carbon steel pressure vessel 154 from corrosive attack by HCl generated in the reactor. A high alumina, nonwoven insulating paper (also not shown) is interposed in one or more layers between the acid tile brick layer 158 and insulating brick layer 156. A feed nozzle 162 (described in connection with FIGS. 14 and 15 below) is provided for supplying the feed and other reactants to the reactor, and a pilot nozzle 164 is provided according to convention for cold start-ups and generally for avoiding explosive conditions in the reactor during interruptions in the flow of the feed to the reactor, or due to other like circumstances.

Figure 17:
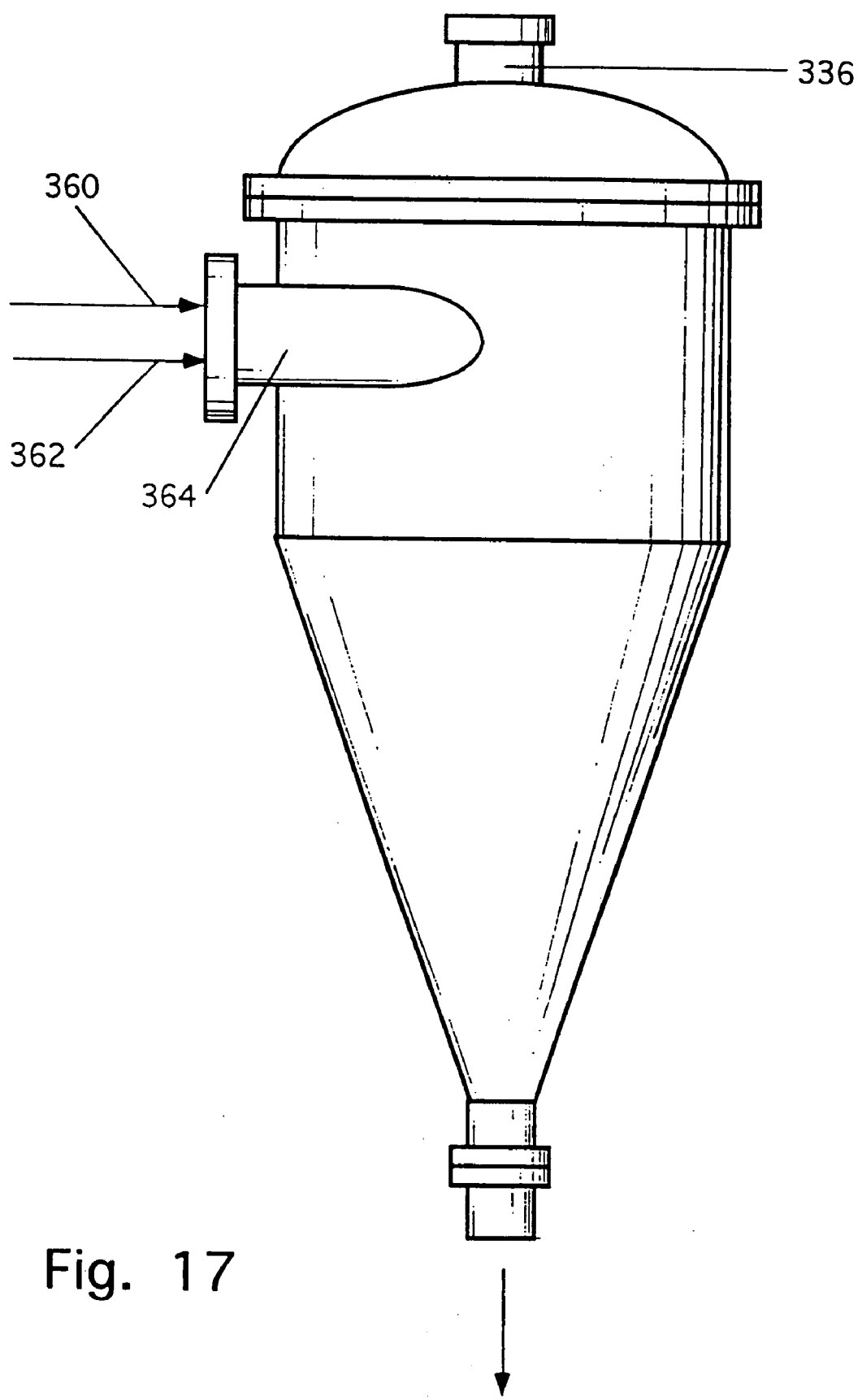
FIG. 17 depicts still another preferred reactor design as may be used in the process of FIG. 3.

A similar, very basic reactor design is shown schematically in FIG. 17, and employs a cyclonic configuration with tangential introduction of the chlorinated hydrocarbon feed 360 and of the oxygen source 362 (and the hydrogen-containing co-feed, steam and the like, where present in accordance with conventional reforming considerations and practice) through a feed nozzle 364. A pilot nozzle 366 is provided as in the embodiment of FIG. 11, and indeed except insofar as the basic configuration of the reactor is concerned, the reactor of FIG. 17 is essentially constructed in the same manner as the reactor of FIG. 11.

Because the reactors of FIG. 11 and FIG. 17 are simple in design and readily and easily constructed, where the desired full conversion and absence of bypassing can be accomplished in a reactor of the type shown in FIG. 11 or of the type shown in FIG. 17, these designs are generally preferred. Where additional mixing and residence time are required, where additional protection against bypassing of feeds is deemed advisable or where perhaps for other reasons neither of these designs proves fully satisfactory, those skilled in the art will appreciate that still other designs can be suitably employed, such as the second, alternative reactor design shown in FIG. 12.

Figure 12:
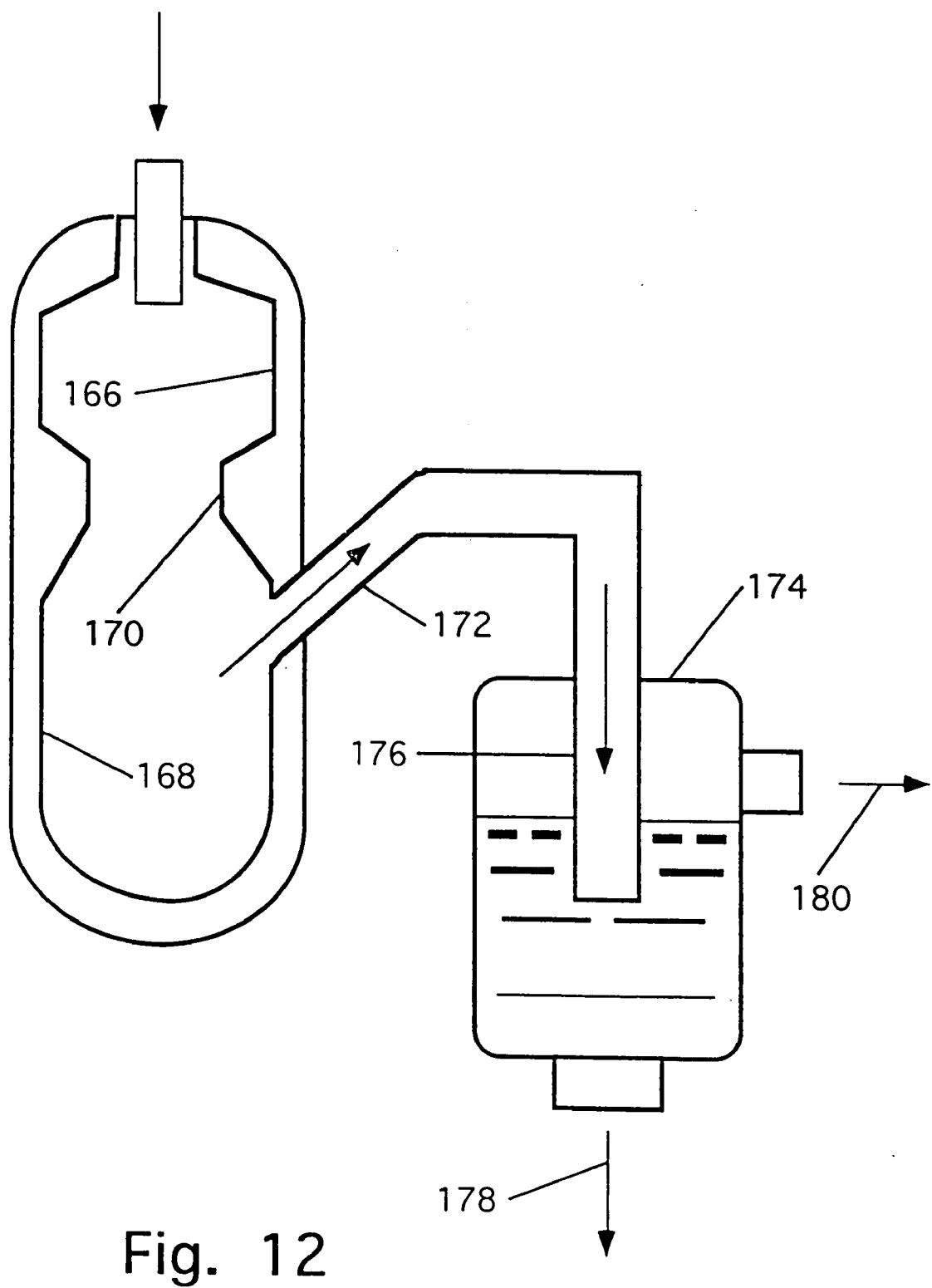
FIG. 12 provides an alternative reactor design to that shown in FIG. 11.

The reactor of FIG. 12 is conventionally vertically oriented, and uses a top, back-mixed reactor section 166 and a gas removal reactor section 168 underlying the top reactor section 166, with a restriction 170 defining and separating the top reactor section 166 and gas removal reactor section 168 and operating with the gas removal reactor section 168 to facilitate back-mixing and conversion in the reactor as a whole.

Bypassing of unconverted halogenated materials in the feed is guarded against by offsetting the inlet to the quench apparatus from the inlet to the reactor, through providing an angled hot gas take-off 172 from the gas removal reactor section 168 which carries the reaction products to a parallel, primary product quench vessel 174 (shown with a submerged quench tube 176, but an overflow weir quench for example also being useful in the vessel 174). Ash and carbonaceous soot are removed from the quench vessel in stream 178, and the reaction product gases 180 are passed on for further processing in accordance with the process of the present invention in its various described embodiments.

Figure 13:
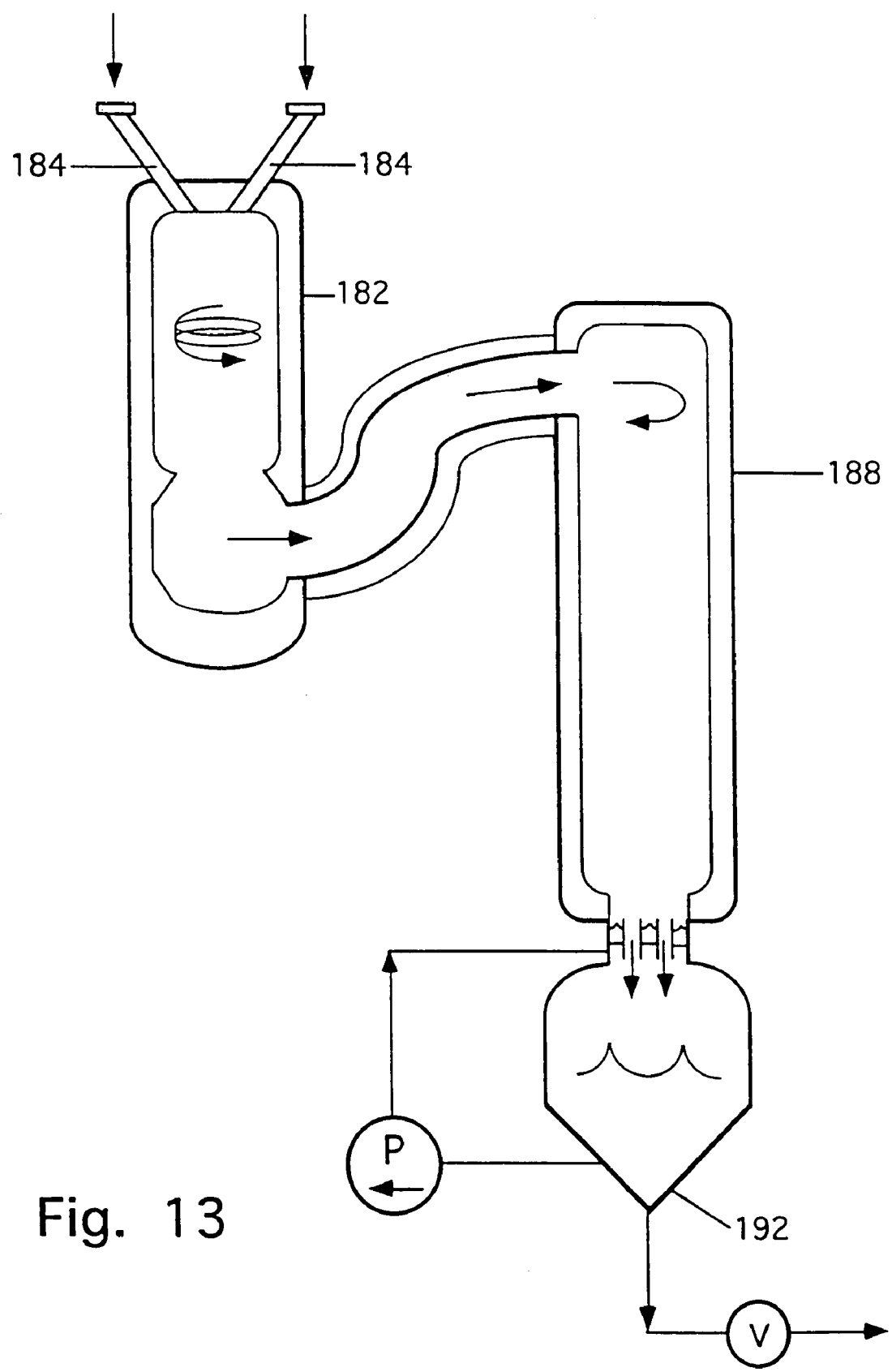
FIG. 13 depicts a second alternative preferred reactor design.

Referring now to FIG. 13, a third exemplary reactor design is shown, and embraces a first, vertical reactor 182 in which the reactants are angularly introduced through dual feed nozzles 184 for inducing swirling and intimate mixing of the reactants in the first reactor 182 and in which preferably substantially all of the halogenated materials in the feed are converted, a hot gas take-off 186 including one or more changes of flow direction/turns, and a second, extended soak reactor 188 providing additional residence time for the reaction product mixture received from the first reactor 182 (via the hot gas take-off 184) at reforming conditions and exhibiting flow behaviors more characteristic of plug flow. Preferably, the hot gas take-off 184 feeds the reaction product mixture from the first reactor 182 into the second reactor 188 tangentially. An overflow weir quench 190 and primary quench vessel 192 (with an ash and soot purge) underlies the second reactor 188.

Variations and combinations of the features found in the reactor designs of FIGS. 11-13 and 17 can also be employed, for example, using baffles (in the form of choke rings, for instance) to increase mixing and residence time in the cylindrical vessel design of FIG. 11, using the angled dual feed nozzles 184 of FIG. 13 in the embodiments of FIG. 11 or 12, and so forth.

The selection of an appropriate feed nozzle can aid substantially in achieving the desired full conversion of the halogenated feed materials, of course. Feed nozzles which have developed in the conventional context of gasifying slurried solid carbonaceous fuels (generally being coal) or the partial oxidation of heavy residual oils from petroleum refining have generally been characterized by fairly substantial flow passages due to plugging concerns, see, for example, U.S. Pat. No. 3,847,564 to Marion et al., U.S. Pat. No. 3,945,942 to Marion et al., U.S. Pat. No. 4,113,445 to Gettert et al., U.S. Pat. No. 4,338,099 to Crouch et al., and U.S. Pat. No. 4,443,230 to Stellaccio. Generally speaking, any of the feed nozzles which have heretofore been known for use in the partial oxidation of various pumpable solid carbonaceous and liquid hydrocarbon fuels should also be useful in the present invention, but in the preferred context of feeding an essentially liquid feed of chlorinated hydrocarbon materials, still other gas-liquid, atomizing feed nozzles are enabled for use and are preferably used that inherently provide for better dispersion and mixing of the feed and other reactants. Exemplary preferred feed nozzles of the compound nozzle type are shown in FIGS. 14 and 15, though those skilled in the art will appreciate that these are non-limiting examples only.

Figure 14:
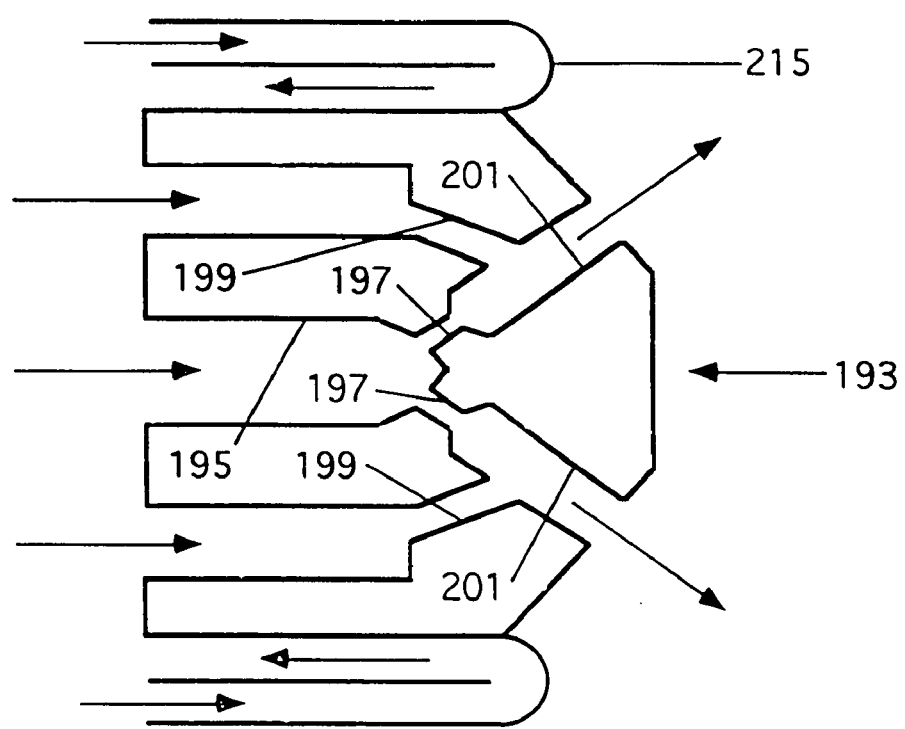
FIGS. 14 and 15 show two preferred embodiments of a feed nozzle for supplying the feed and other reactants to the reactor in the present invention.

Referring now to FIG. 14, a nozzle 193 is shown of the "Y jet" variety, in which a gas stream (in the present context being typically oxygen, oxygen and steam (as a temperature moderator and/or hydrogen source), oxygen and a hydrogen-containing co-feed such as methane, or oxygen, steam and methane in combination) is delivered from a central channel 195 through an annular orifice 197 for atomizing the liquid feed conveyed through an outer annular orifice 199, and the mixture of feed and reactants discharged to the reactor through annular exit orifice 201. Cooling water is circulated about the nozzle 193 in annular cooling water channel 215.

Figure 15:
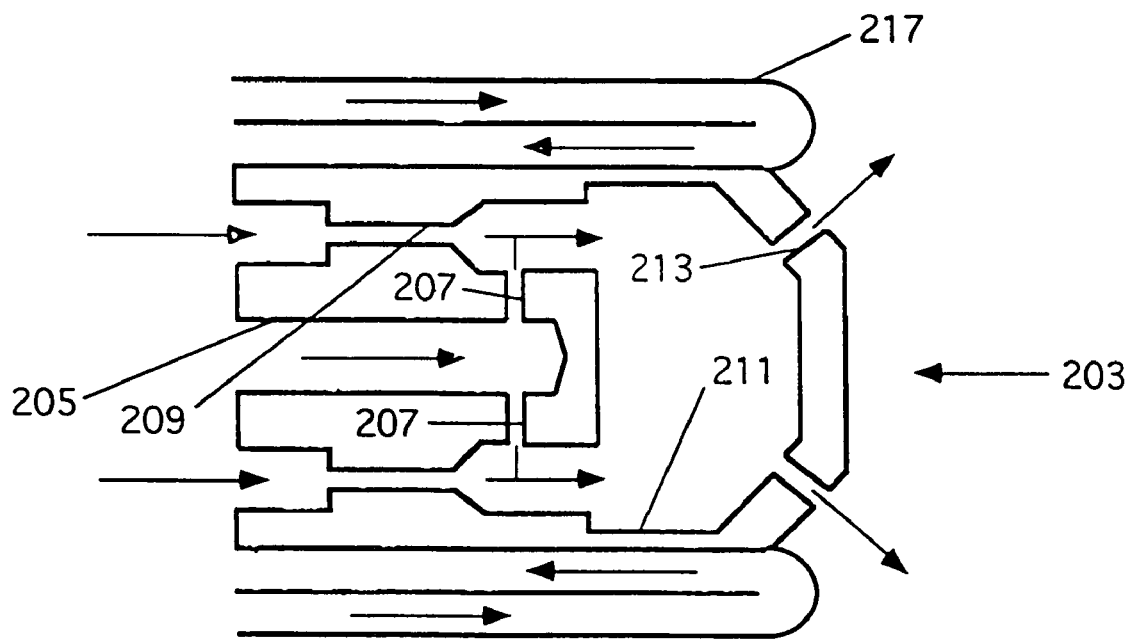

FIG. 15 shows a compound nozzle 203 of the "T jet" variety, in which the liquid feed is conveyed through the central channel 205 and delivered into contact with an atomizing gas stream via a plurality of lateral flow channels 207. The oxygen (and any steam and/or methane) used for atomizing the liquid feed is provided through an annular orifice 209, and the mixture of feed and reactants is then received in an internal mixing chamber 211 before being discharged to the reactor through annular exit orifice 213. Cooling water is also provided about the nozzle 203 through annular cooling water channel 217.

A preferred, illustrative embodiment of the process and apparatus of the present invention as a whole is shown in FIGS. 16A through 16G, in which byproduct and waste chlorinated materials from various source processes are collected in feed tanks 194, 196 and 198, preheated as appropriate with available process steam in an exchanger 200, and fed as a mixed liquid feed 202 to a main feed nozzle (or nozzles) 204 of a reactor 206. Oxygen is supplied in stream 208 through the main feed nozzle 204 and as appropriate through a pilot nozzle 210, and is limited as necessary to maintain reducing conditions in the reactor 206, with steam optionally being made available in stream 212 as a temperature moderator in accord with conventional reforming practice and with a hydrogen-containing co-feed (usually methane) also being provided as needed in stream 214. Cooling water in stream 216 is preferably used for providing localized cooling in conjunction with the atomization and injection of the mixed liquid feed 202 via main feed nozzle 204, and nitrogen is preferably supplied in stream 218 for purging instrument connections and for purging the reactor in shutdowns of the process. With respect to the pilot nozzle 210, the known practice of some users of partial oxidation technology is to use the pilot nozzle 210 on essentially a continuous basis, while others will supply methane and oxygen to the reactor through the pilot burner only for cold start-ups.

In any case, for purposes of the present invention, preferably only a small percentage of the heating value in any ultimate product synthesis gas (whether that product synthesis gas is used as a fuel or not) is accounted for by the supplemental hydrogen-containing co-feed, so that preferably less than about 10 percent, more preferably less than about 5 percent, of the heating value of any product synthesis gas derived from the process is attributable to the methane or other hydrogen-containing co-feed 214. At a minimum, of course, sufficient hydrogen is provided to enable essentially all of the chlorines found in the feed 202 to be manifested as hydrogen chloride in the reaction product from the reactor 206. Typical operating conditions for the reactor 206 are a temperature of from about 1100 degrees Celsius to about 1500 degrees Celsius and an operating pressure of from less than 1 to about 10 bars absolute, with residence times of from less than 1 to about 5 seconds also being typical but being sufficient in any case to fully convert the feed 202.

The reaction product from the reactor 206 (comprised of hydrogen chloride, carbon monoxide, hydrogen, smaller amounts of carbon dioxide and water, and limited amounts of particulate matter deriving from inorganic materials in the feed, corrosion products and carbonaceous soot produced under reducing conditions in the reactor 206) then proceeds to a primary quench vessel 222 preferably employing an overflow weir quench, and which is supplied with cold concentrated aqueous HCl in stream 224 from a second quench vessel 226, in stream 228 from an absorber (see FIG. 16C) and in stream 230 from the filtration of a concentrated aqueous HCl stream (see FIG. 16D) for clean-up and sale or use, and/or for subsequent distillation to anhydrous form, as a quench liquid.

Soot and insoluble inorganic ash collected by sedimentation at the bottom of the primary quench vessel is periodically or continuously purged in stream 232 to a subsequent neutralization step (FIG. 16G), or optionally recycled in whole or in part to the reactor 206 as described previously.

The quenched reaction product gases 234 from the primary quench vessel 222, containing some level of entrained liquid and some corresponding amount of particulate material, are then conveyed to a high energy venturi scrubber 236 for providing intensive gas/liquid contact of the reaction product gases 234 with cold, concentrated aqueous HCl streams and removing additional solids to the quench liquid. Subsequently the venturi scrubber effluent 238 is conveyed to a second quench vessel 226, with a recycle quench liquid 224 being derived from the second quench vessel 226 for use in the primary quench vessel 222 and in the venturi scrubber 236. The twice-quenched reaction product gases 240 from the second quench vessel 226 are preferably passed through a demister (not shown) to knock out entrained liquid and any residual particulate solids contained therein, and subsequently are conveyed to a packed acid absorber 242 (see FIG. 16C). As in Hoechst's acid recovery scheme from incineration as summarized above with respect to FIG. 2, an azeotropic composition aqueous hydrochloric acid stream 244 derived from a subsequent desorber/HCl stripper (referenced as item 296 in FIG. 16E) is supplied to the absorber 242 as the absorbent, with optionally additional make-up water being supplied in stream 246 as needed to minimize HCl carryover from the absorber 242 to the product synthesis gas scrubber 248. A concentrated aqueous hydrochloric acid bottoms stream 250 of preferably about 25 percent or more, and (with sufficient additional cooling of the bottoms stream 250 from the absorber 242) especially about 34 percent by weight or more of hydrogen chloride in water is in this manner produced from the absorber 242.

A portion of the bottoms stream 250 is recirculated to the absorber 242, and the remainder is conveyed to an optional further particulate removal vessel/settler 252. The stream 228 used in part to supply the quench liquid in the quench vessels 222 and 226 is derived from the bottom of the settler vessel 252, and the remaining concentrated aqueous hydrochloric acid stream 254 is passed to a clean-up segment of the overall process as described below.

The acid-lean, product synthesis gas produced as the overheads stream 256 from the absorber 242 is dried by passage through a condenser 258, and a second, high energy venturi 260 is used in combination with a conventional packed scrubber 248 for neutralizing any hydrogen chloride carried over in the overheads 256. An alkaline stream 262 which is typically caustic soda is supplied for neutralizing the residual HCl in the product synthesis gas 256, and a chlorine (or free halogen) scavenger in the form of an aqueous hydrogen peroxide, sodium bisulfite solution or the like can be used as appropriate in stream 264. The resultant salt-bearing wastewater stream 266 is conveyed to the vents scrubber (item 342 in FIG. 16G), and the recovered product synthesis gas 268, having a higher heating value of at least about 75 and preferably at least about 100 British Thermal Units (BTUs) per cubic foot under dry standard conditions corresponding to a temperature of zero degrees Celsius and one atmosphere of pressure, is then suited for being sold or used as a feed or fuel.

Figure 16A:
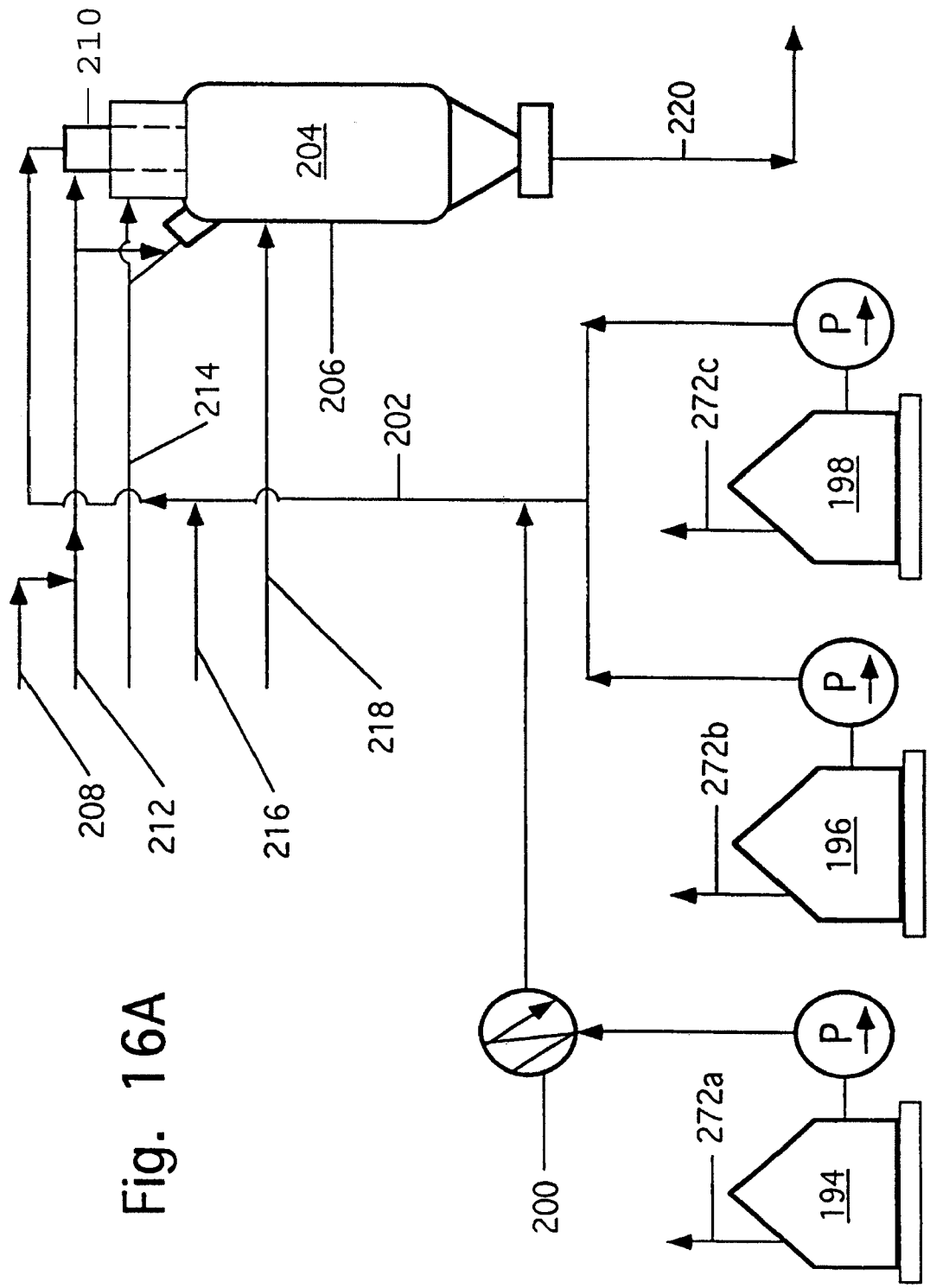
FIGS. 16A through 16G show a process of the present invention in a presently preferred, illustrative embodiment.
Figure 16B:
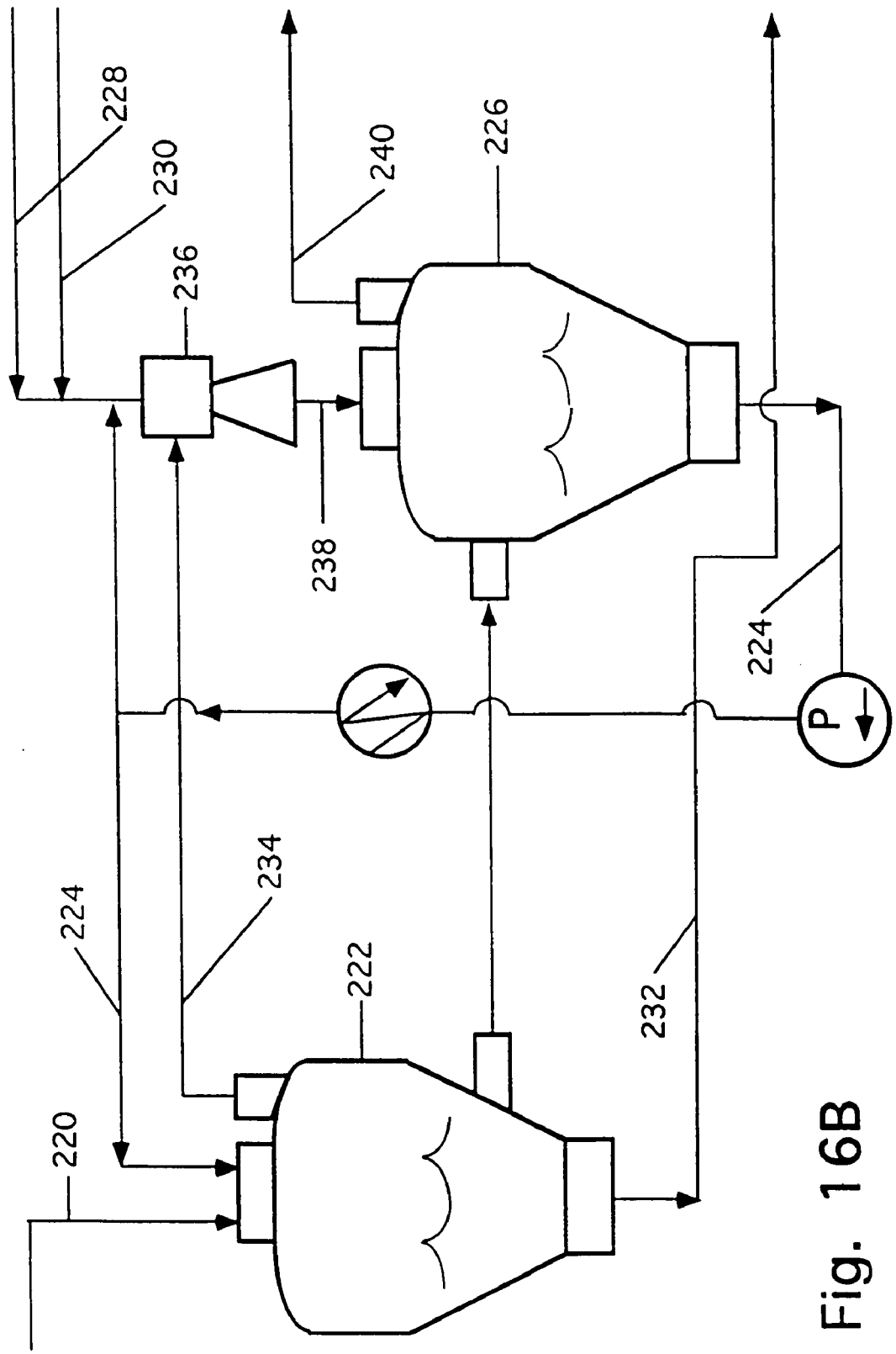
Figure 16C:
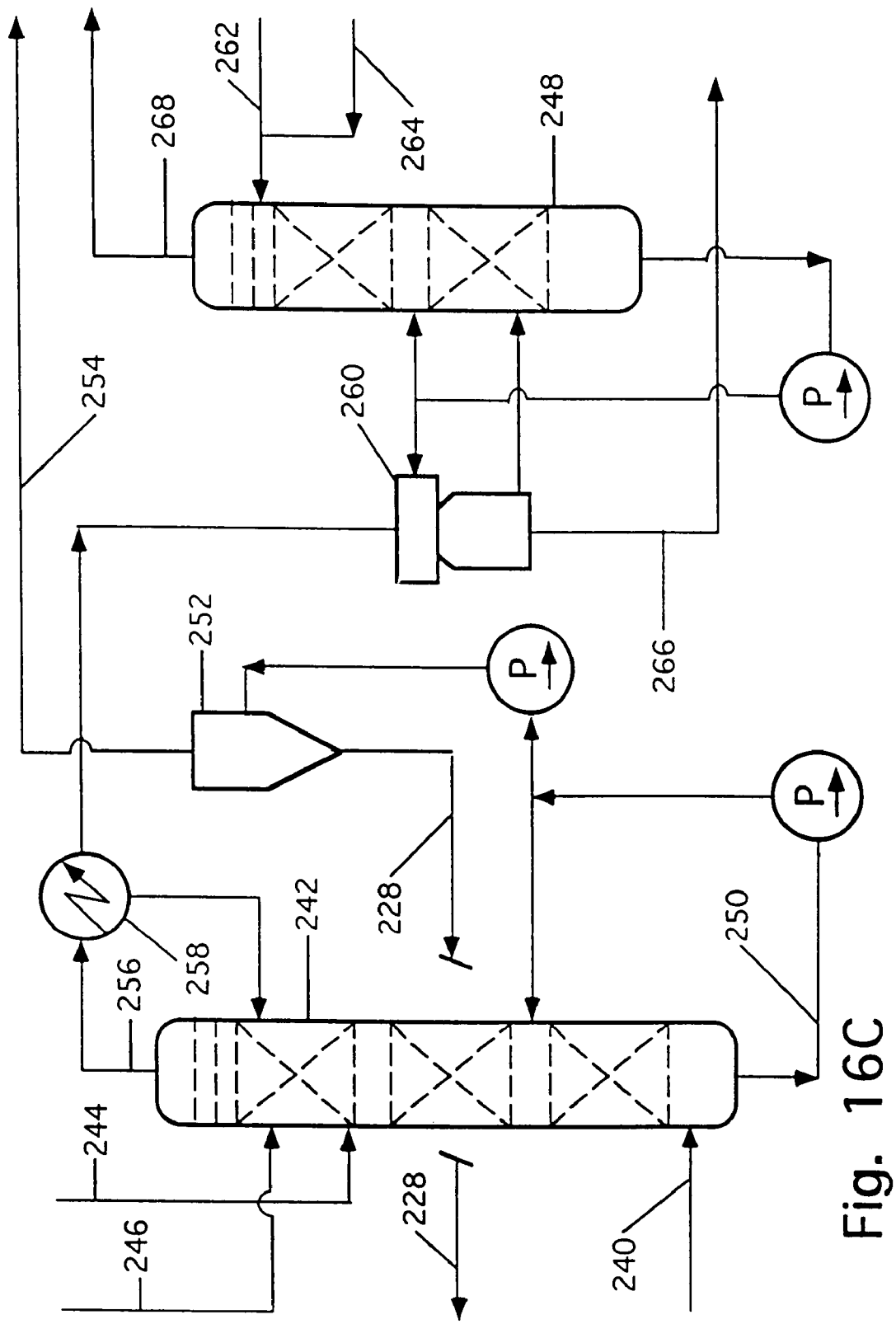
Figure 16D:
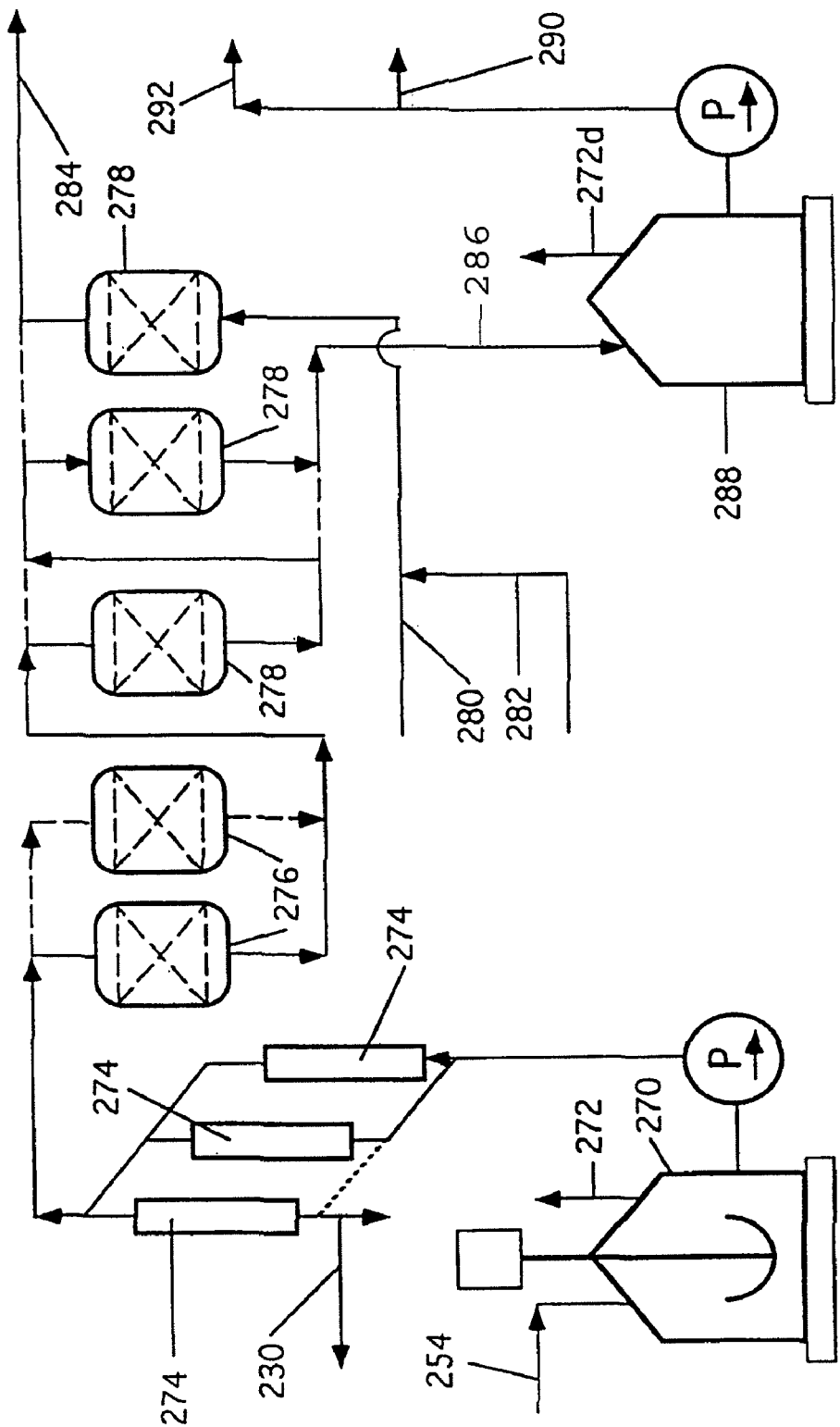
Figure 16E:
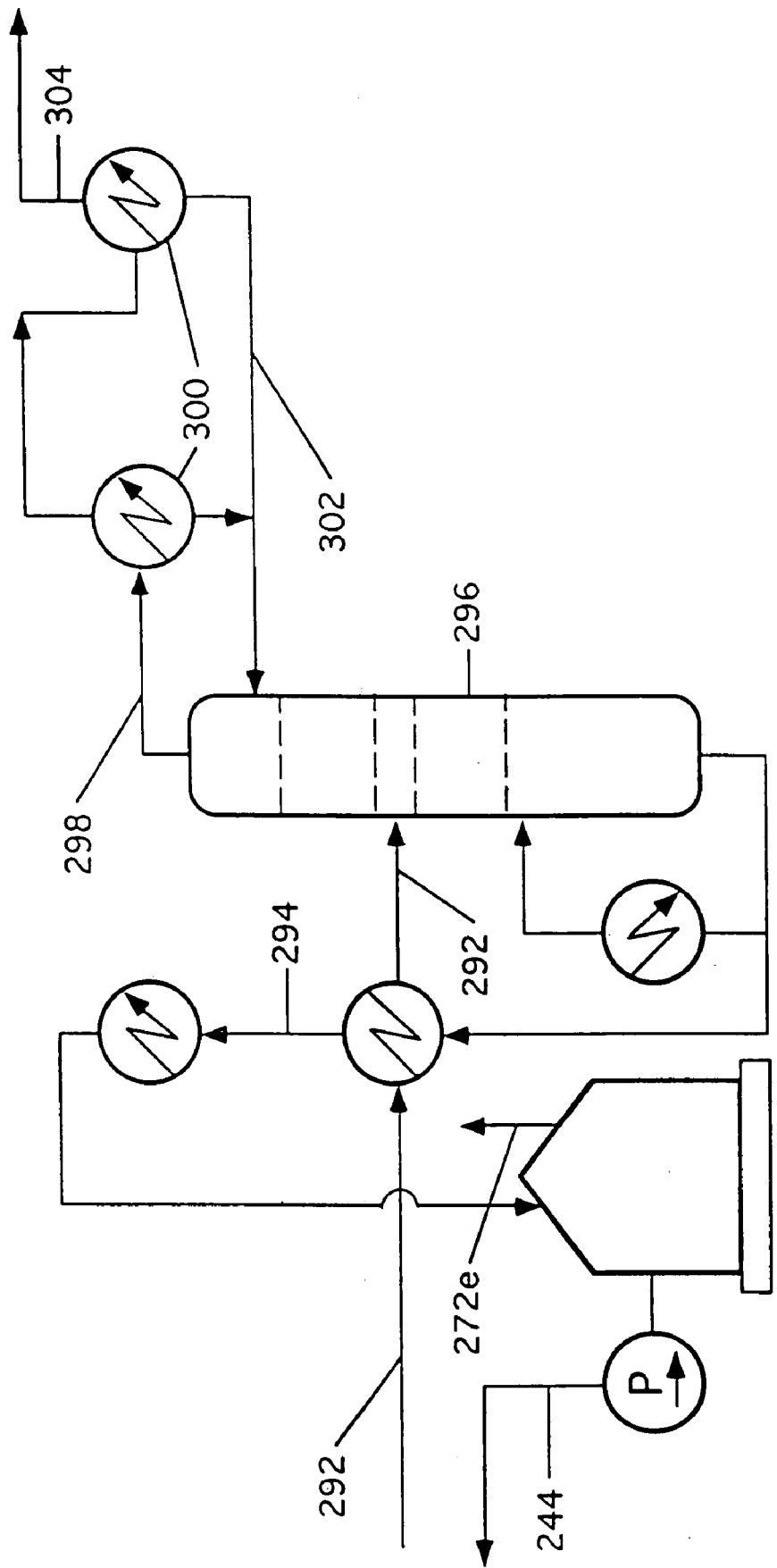
Figure 16F:
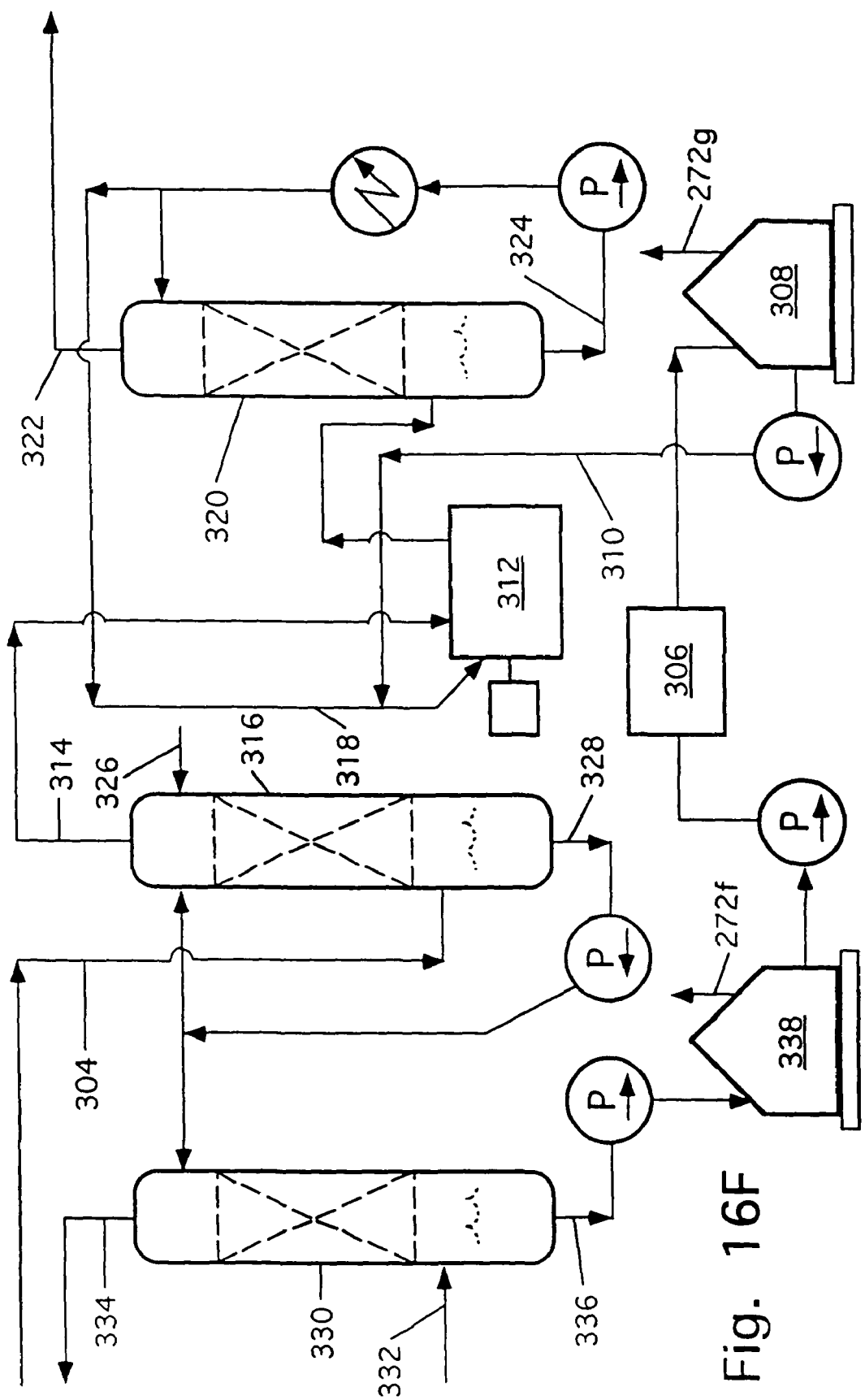
Figure 16G:
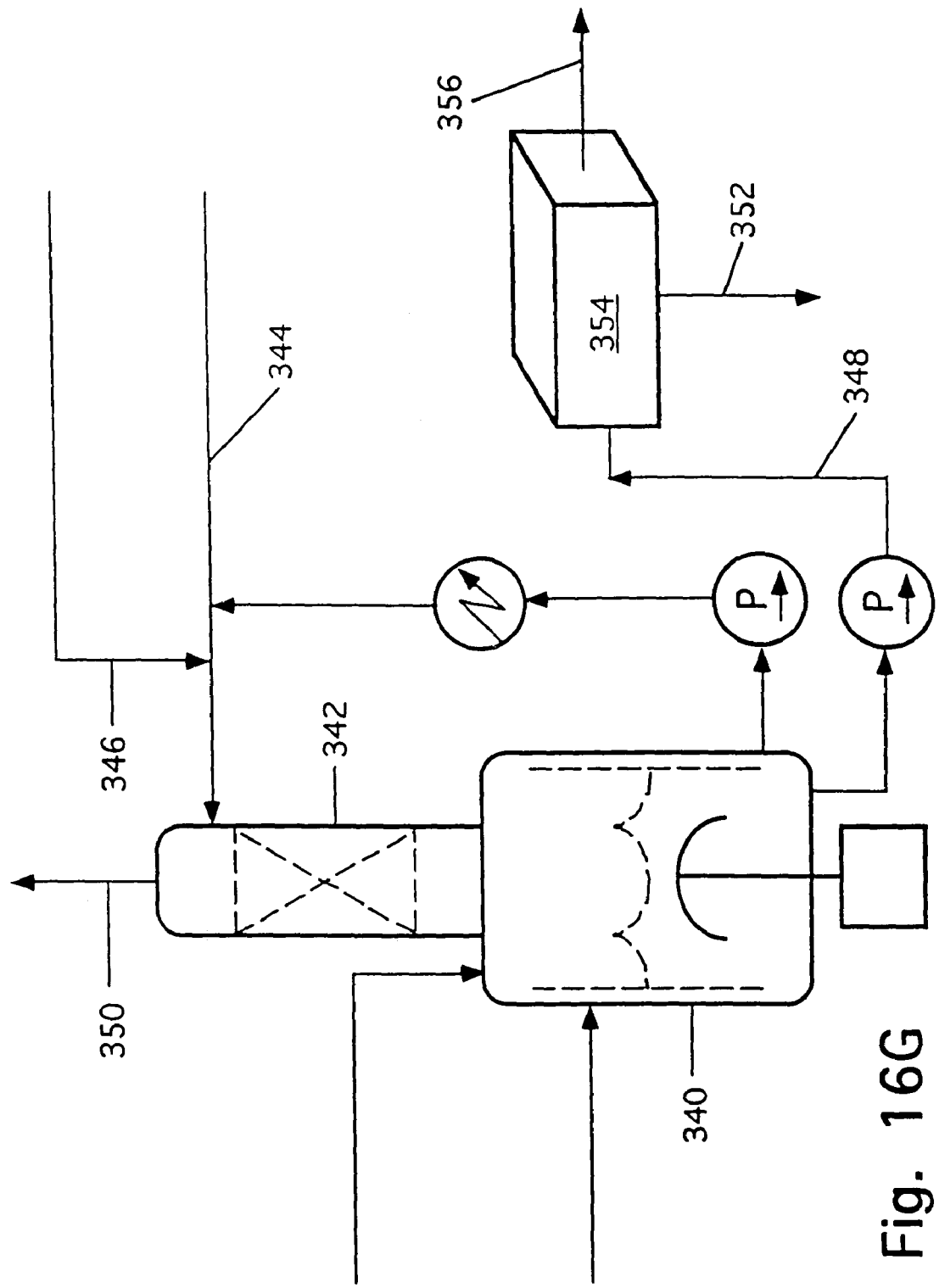

The concentrated aqueous hydrochloric acid stream 254 is placed in an agitated crude HCl tank 270 equipped with a vent 272 for, e.g., residual hydrogen (the vent stream 272 is conventionally communicated, along with vents 272a through 272g from the other storage tanks depicted, to the vents scrubber 342 shown in FIG. 16G), and pumped through a set of periodically backflushed tubular guard filters 274, carbon beds 276 and ion exchange beds 278 to remove residual particulate solids and dissolved metal salts. Ion exchange beds 278 are purged with water (stream 280) and steam (shown as stream 282) in a conventional manner, and the purge stream 284 conveyed to the vents scrubber 342 for neutralization. The clean concentrated aqueous hydrochloric acid 286 from the ion exchange beds 278 is then available through storage tank 288 for sale or use in stream 290, or can then be distilled to anhydrous form as indicated by stream 292.

As shown in FIG. 16E, the sales quality concentrated aqueous hydrochloric acid 292 is preheated by cross-exchange with an azeotropic composition HCl bottoms stream 294 from the HCl desorber/stripper 296, and the concentrated aqueous stream 292 then fed to the desorber/stripper 296. As is known, the azeotropic concentration of HCl in water decreases with increasing pressure, facilitating the use of pressure to "break" the azeotrope and produce an anhydrous HCl product. Hoechst's commercial acid recovery scheme summarized above takes advantage of this fact in an incineration context, and the process embodiment of FIGS. 16A through 16G in essentially the same manner provides the azeotropic composition HCl bottoms stream 294, a portion of which is then made available for recycle to the absorber 242 as stream 244 for making a more highly concentrated aqueous HCl product, and a mostly anhydrous HCl overheads stream 298. Those skilled in the art will appreciate in passing that a number of different combinations of unit operations and techniques have been defined for "breaking" the water/HCl azeotrope and for providing for anhydrous HCl recovery, that could conceivably be used in place of the system shown. Some of these less preferred techniques are described in McKetta and Cunningham, *Encyclopedia of Chemical Processing and Design*, Volume 26, "Hydrochloric Acid", pages 396-417, as well as in Kiang and Metry, *Hazardous Waste Processing Technology*, pages 249-255, Butterworth Publishers, Boston (1982).

The overheads stream 298 from the desorber/stripper 296 is then fed to a series of condensers 300 to dry the HCl overheads stream 298 to an extent whereby the stream 298 is suitable for use as an oxychlorination feed in an EDC/VCM manufacturing process, generally containing not more than about 100 parts per million of water. The condensed HCl solution 302 from the condensers 300 is preferably refluxed as shown to the desorber/stripper 296, but can also be recycled to the absorber 242.

In the event an oxychlorination process is not nearby so that the essentially anhydrous HCl stream 304 must be compressed and pipelined to another location, or where for other reasons it is desired to further dry the HCl product 304 received from the desorber/stripper 296, the illustrative preferred process embodiment of FIGS. 16A through 16G preferably further includes sulfuric acid drying of the HCl product stream 304, as shown in one possible embodiment in FIG. 16F.

Dry sulfuric acid is delivered in the embodiment of FIG. 16F from a truck loading facility 306 to a vent-equipped dry sulfuric acid tank 308. The dry sulfuric acid 310 is then pumped to a liquid ring compressor 312, where the dry sulfuric acid 310 is combined with a partially dried hydrogen chloride overheads stream 314 from a first packed absorber column 316 which receives the HCl product stream 304 from the condensers 300, and with a recycle, partially wet sulfuric acid stream 318 from a second packed absorber column 320. The partially dried HCl 314 from the first absorber column 316 is then further dried in the second packed absorber column 320, to provide a pipeline-ready anhydrous HCl vapor stream 322 overhead and a partially wet sulfuric acid bottoms stream 324 that is refluxed in part and that also provides the recycle, partially wet sulfuric acid stream 318 supplied to the compressor 312. Still a third part 326 of the partially wet sulfuric acid bottoms stream 324 is used in the first packed absorber column 316, for contacting the higher water content HCl product 304 from the condensers 300 and for drawing additional water therefrom to produce the partially dried HCl overheads stream 314 then fed to the compressor 312 and to the second packed absorber 320. The fully wet sulfuric acid emerges as a bottoms stream 328 from the first packed absorber 316, is recycled in part to the top of the first packed absorber column 316 and in part is supplied to a packed stripper column 330 which uses dry air in stream 332 to pull residual HCl from the wet sulfuric acid overhead in a vents stream 334, the vents stream 334 thereafter of course being neutralized with the other process vents in the vent scrubber 342 of FIG. 16G. The HCl-stripped, wet sulfuric acid 336 from the stripper 330 is then stored in tank 338 for shipment, drying and reclaimation by a merchant supplier of dry sulfuric acid. Those skilled in the art will recognize that other arrangements of apparatus can be employed for carrying out the preferred sulfuric acid drying of the HCl stream 304, including the use for example of a single absorber with several stages as opposed to the two absorbers 316 and 320.

Referring, finally, to FIG. 16G, all of the various liquid waste streams and process vents (including streams 232, 266, 272 and 272a through 272g, 284 and 334) are communicated to a scrubber tank 340 and packed vent scrubber 342 supplied with a suitable base (stream 344) (caustic soda, for example) and with a residual chlorine/free halogen scavenger in stream 346, for generating a filterable wastewater stream 348 containing the ash and soot collected from the particulate removal section of the process and a vent 350. The ash and soot are conventionally collected and removed as stream 352 from a filter press 354 and landfilled or incinerated, and the filtrate 356 is sent to a wastewater treatment facility.

What is claimed is:

1. A process for converting a feed comprised substantially of halogenated materials to one or more useful products selected from one or more useable or salable halogen acid products in aqueous or anhydrous form and a product synthesis gas comprised of carbon monoxide and hydrogen, which process includes the steps of:
    a) providing the feed, an oxygen source and a supplemental hydrogen-containing co-feed as required to enable the conversion of substantially all of the halogenated materials in the feed to a corresponding hydrogen halide, to a partial oxidation reforming reactor zone under reducing conditions; wherein the co-feed is one selected from the group consisting of methane and a mixture of methane and steam;
    b) recovering from the reactor zone a reaction product comprised of one or more hydrogen halides, water, carbon monoxide and hydrogen but containing essentially no unconverted halogenated materials; and
    c) separating out and recovering without an intervening neutralization step from the reaction product, either or both of i) one or more useable or salable halogen acid products in aqueous or anhydrous form and ii) a product synthesis gas comprised of carbon monoxide and hydrogen.

2. A process as defined in claim 1, wherein the oxygen source is comprised of one or more oxygen-containing gases selected from oxygen, air, oxygen-enriched air and carbon dioxide.

3. A process as defined in claim 1, wherein the halogenated materials are comprised substantially entirely of byproduct and waste chlorinated materials.

4. A process as defined in claim 3, wherein the feed is characterized by an overall chlorine content of at least about 15 percent by weight.

5. A process as defined in claim 4, wherein the feed is substantially liquid in form and includes one or more of heavy and light distillation fractions from a chlor-alkali manufacturing process, from the manufacture of ethylene dichloride and vinyl chloride monomer or of chlorinated solvents, or from the manufacture of olefin oxides via a chlorohydrin intermediate, polychlorinated biphenyl-contaminated transformer oils and heat transfer fluids, chlorinated pesticide and herbicide wastes and waste chlorinated solvents.

6. A process as defined in claim 5, wherein the feed further includes dioxin- and/or furan-laden particulates.

7. A process as defined in claim 1 or as defined in claim 4, wherein the feed is characterized as relatively ash-free, including less than about 5 percent of ash and other inorganic materials.

8. A process as defined in claim 1, wherein the feed includes fluorinated organic materials.

9. A process as defined in claim 1, wherein the feed is substantially a liquid with any particulate solids present being smaller than about 2 millimeters in size.

10. A process as defined in claim 9, wherein any particulate solids are smaller than about 500 microns in size.

11. A process as defined in claim 10, wherein any particulate solids are smaller than about 200 microns in size.

12. A process as defined in claim 11, wherein any particulate solids are smaller than about 100 microns in size.

13. A process as defined in any of claims 9 through 12, further comprising the steps of grinding a part or the whole of the feed to meet the indicated particulate solids size limitation, using a classification device internal to the grinder used for the grinding step or located downstream thereof for permitting only those particulate solids meeting the indicated size limitation to be passed to the partial oxidation reforming reactor zone, and recycling any larger particulate solids back for being further ground to size.

14. A process as defined in claim 1, wherein the halogenated materials include at least some chlorinated materials, the reaction product from the reactor is characterized as being substantially free of dioxins and furans and wherein the step of recovering the reaction product includes a rapid wet gas quench step and a particulate removal step for collecting undissolved particulate solids from the quench step and removing these solids from the reaction product.

15. A process as defined in claim 14, wherein the collected undissolved particulate solids are intermittently or periodically purged from the process.

16. A process as defined in claim 14, wherein the collected undissolved particulate solids are substantially all recycled to complete conversion in the partial oxidation reforming reactor.

17. A process as defined in claim 14, wherein the particulate removal step includes flux force/condensation scrubbing.

18. A process as defined in claim 17, further comprising demisting the quenched and scrubbed reaction product to prevent any carryover of entrained particulate matter to downstream apparatus for the separation and recovery of product(s) step.

19. A process as defined in claim 1, wherein the step of recovering the reaction product includes a hot gas filtration step to remove particulate solids from the reaction product followed by a quench cooling step on the gas from the hot gas filtration step.

20. A process as defined in claim 1, wherein the step of recovering the reaction product includes passing the reaction product through a heat recovery unit to recover heat value from the reaction product and to cool the reaction product to a temperature in excess of the dew point of hydrogen halides in the reaction product, but which is suitable for allowing the removal of particulate solids from the reaction product in a baghouse filtration apparatus, then removing particulate solids from the reaction product by baghouse filtration and quench cooling the filtered reaction product.

21. A process as defined in claim 1, wherein the step of recovering the reaction product includes spraying a vaporizable liquid into the reaction product to cool the reaction product to a temperature in excess of the dew point of hydrogen halides contained in the reaction product, but which is suitable for allowing the removal of particulate solids from the reaction product in a baghouse filtration apparatus, then removing particulate solids from the reaction product by baghouse filtration and quench cooling the filtered reaction product.

22. A process as defined in claim 3, wherein the step of recovering the reaction product includes spraying a vaporizable liquid into the reaction product to cool the reaction product to a temperature in excess of the dew point of hydrogen halides contained in the reaction product, but which is suitable for allowing the removal of particulate solids from the reaction product in a baghouse filtration apparatus, then removing particulate solids from the reaction product by baghouse filtration and quench cooling the filtered reaction product.

23. A process as defined in either of claim 21 or claim 22, wherein the vaporizable liquid is comprised of an aqueous hydrochloric acid solution recycled back from one or more sources in the process downstream of the recited spray cooling step.

24. A process as defined in any of claim 14, 19, 20, 21 or 22, comprising passing the reaction product following the quench and particulate removal steps to an acid absorption step, for removing hydrogen halides from the reaction product into an absorbent and forming an acid-lean, product synthesis gas as the overheads from the acid absorption step.

25. A process as defined in claim 24, further comprising removing residual halogen content from the acid-lean, product synthesis gas by scrubbing the product synthesis gas with an alkaline solution optionally including a free halogen scavenger.

26. A process as defined in claim 25, further comprising the step of removing or counteracting any halogen acid aerosol in the acid-lean, product synthesis gas.

27. A process as defined in claim 24, wherein the absorbent is a weak aqueous acid solution or water, and the concentrated halogen acid solution resulting therefrom is distilled to provide an anhydrous acid product.

28. A process as defined in claim 27, wherein the anhydrous halogen acid product is essentially only anhydrous hydrochloric acid, and wherein the process further comprises the step of feeding the anhydrous hydrochloric acid to an oxychlorination reactor of an ethylene dichloride/vinyl chloride monomer manufacturing process.

29. A process as defined in claim 24, wherein the acid-lean, product synthesis gas possesses a higher heating value of at least about 75 BTUs per standard cubic foot on a dry basis, where the referenced standard conditions correspond to a temperature of zero degrees Celsius and one atmosphere of pressure.

30. A process as defined in claim 29, wherein the product synthesis gas possesses a higher heating value of at least about 200 BTUs per dry standard cubic foot, where the referenced standard conditions correspond to a temperature of zero degrees Celsius and one atmosphere of pressure.

31. A process as defined in claim 30, further comprising producing methanol, ammonia, acetic acid, acetic anhydride or 1,3-propanediol with the product synthesis gas.

32. The process as defined in claim 1, wherein the co-feed is methane.

33. The process as defined in claim 1, wherein the co-feed is a mixture of methane and steam.

* * * * *